United States Patent
Beard et al.

(10) Patent No.: US 9,969,315 B2
(45) Date of Patent: May 15, 2018

(54) PNEUMATIC INFLATOR FOR AUTOMATICALLY INFLATING INFLATABLE ARTICLES TO A DESIRED PRESSURE

(71) Applicant: Signode Industrial Group LLC, Glenview, IL (US)

(72) Inventors: Anthony K. Beard, Poyen, AR (US); Thomas A. Ketzer, Wauconda, IL (US); Thomas C. Keenan, Brentwood, TN (US)

(73) Assignee: Signode Industrial Group LLC, Glenview, IL (US)

( * ) Notice: Subject to any disclaimer, the term of this patent is extended or adjusted under 35 U.S.C. 154(b) by 450 days.

(21) Appl. No.: 14/695,994

(22) Filed: Apr. 24, 2015

(65) Prior Publication Data

US 2015/0375670 A1    Dec. 31, 2015

Related U.S. Application Data

(60) Provisional application No. 62/018,911, filed on Jun. 30, 2014.

(51) Int. Cl.
*B60P 7/06* (2006.01)
*G05D 16/16* (2006.01)

(52) U.S. Cl.
CPC .............. *B60P 7/065* (2013.01); *G05D 16/16* (2013.01); *Y10T 137/36* (2015.04); *Y10T 137/777* (2015.04); *Y10T 137/7769* (2015.04)

(58) Field of Classification Search
CPC ........... Y10T 137/7769; Y10T 137/777; Y10T 137/36; B60P 7/065; G05D 16/16

USPC ............ 251/28, 29; 141/197; 137/224, 492, 137/492.5

See application file for complete search history.

(56) References Cited

U.S. PATENT DOCUMENTS

| | | | |
|---|---|---|---|
| 2,960,942 A | 11/1960 | Pier et al. | |
| 3,098,455 A | 7/1963 | McElroy et al. | |
| 3,104,675 A * | 9/1963 | Blenman | B63C 9/24 137/225 |
| 3,726,307 A * | 4/1973 | Carman | G05D 16/2053 137/487.5 |
| 3,915,096 A | 10/1975 | Salisbury | |
| 4,051,715 A | 10/1977 | Ledeen et al. | |
| 4,102,364 A | 7/1978 | Leslie et al. | |

(Continued)

*Primary Examiner* — William McCalister
(74) *Attorney, Agent, or Firm* — Neal, Gerber & Eisenberg LLP

(57) ABSTRACT

Various embodiments of the present disclosure provide a pneumatic inflator for automatically inflating inflatable articles, such as dunnage bags, to a desired pressure. Generally, once activated, the pneumatic inflator of the present disclosure inflates an inflatable article via a compressed air source until the air pressure inside the inflatable article reaches an operator-selected desired pressure. Thereafter, the pneumatic inflator automatically stops inflating the inflatable article. In various embodiments, the pneumatic inflator also includes a manual shut-off that, when activated while the pneumatic inflator is inflating the inflatable article, causes the pneumatic inflator to stop inflating the inflatable article. The pneumatic inflator of the present disclosure thus enables automatic inflation of inflatable articles to particular, operated-selected desired pressures with limited operator input.

20 Claims, 15 Drawing Sheets

(56) References Cited

U.S. PATENT DOCUMENTS

| | | | |
|---|---|---|---|
| 4,146,069 A | 3/1979 | Angarola et al. | |
| 4,146,070 A | 3/1979 | Angarola et al. | |
| 4,418,737 A * | 12/1983 | Goodell | B60C 23/00 137/224 |
| 4,583,566 A * | 4/1986 | Kalavitz | B60C 23/001 137/101.19 |
| 4,614,479 A * | 9/1986 | Liu | F04B 49/022 137/224 |
| 4,714,098 A * | 12/1987 | Stuckel | A63B 41/12 141/197 |
| 4,723,474 A | 2/1988 | Flohr | |
| 4,782,879 A * | 11/1988 | Le Chatelier | B60C 23/003 137/225 |
| 4,872,492 A | 10/1989 | McAnally et al. | |
| 4,905,742 A * | 3/1990 | Mohs | B60S 5/043 137/224.5 |
| 5,056,558 A * | 10/1991 | Rodgers | B61D 45/008 137/552 |
| 5,180,456 A | 1/1993 | Schultz et al. | |
| 5,293,910 A * | 3/1994 | Mohs | B60S 5/043 137/224 |
| 5,309,969 A * | 5/1994 | Mittal | B60C 23/003 137/224.5 |
| 5,409,045 A * | 4/1995 | Walker | B60C 23/003 141/38 |
| 5,454,407 A * | 10/1995 | Huza | B60P 7/065 141/10 |
| 5,566,728 A | 10/1996 | Lange | |
| 5,806,572 A | 9/1998 | Voller | |
| 5,829,492 A | 11/1998 | Gavronsky et al. | |
| 6,129,491 A | 10/2000 | Duursma et al. | |
| 6,253,806 B1 | 7/2001 | Sperry et al. | |
| 6,253,919 B1 | 7/2001 | Sperry et al. | |
| 6,293,147 B1 * | 9/2001 | Parker | G01M 1/16 340/870.16 |
| 6,729,110 B2 | 5/2004 | Sperry et al. | |
| 6,746,190 B2 * | 6/2004 | Freeman | B60P 7/065 410/119 |
| 7,320,347 B2 | 1/2008 | Ramsey et al. | |
| 7,455,086 B1 | 11/2008 | Elze et al. | |
| 7,610,929 B2 | 11/2009 | Zielinski et al. | |
| 7,677,267 B2 * | 3/2010 | Warnick | F15B 11/028 137/492.5 |
| 7,770,612 B1 * | 8/2010 | Brown | B60P 7/065 137/224 |
| 7,913,724 B2 | 3/2011 | Pansegrouw | |
| 7,980,799 B1 | 7/2011 | Rioux et al. | |
| 8,192,120 B1 | 6/2012 | Gess | |
| 8,251,624 B2 | 8/2012 | Tschantz et al. | |
| 8,459,915 B1 | 6/2013 | Gess | |
| 2010/0189528 A1 | 7/2010 | Tschantz et al. | |
| 2012/0059546 A1 | 3/2012 | Wilson et al. | |

\* cited by examiner

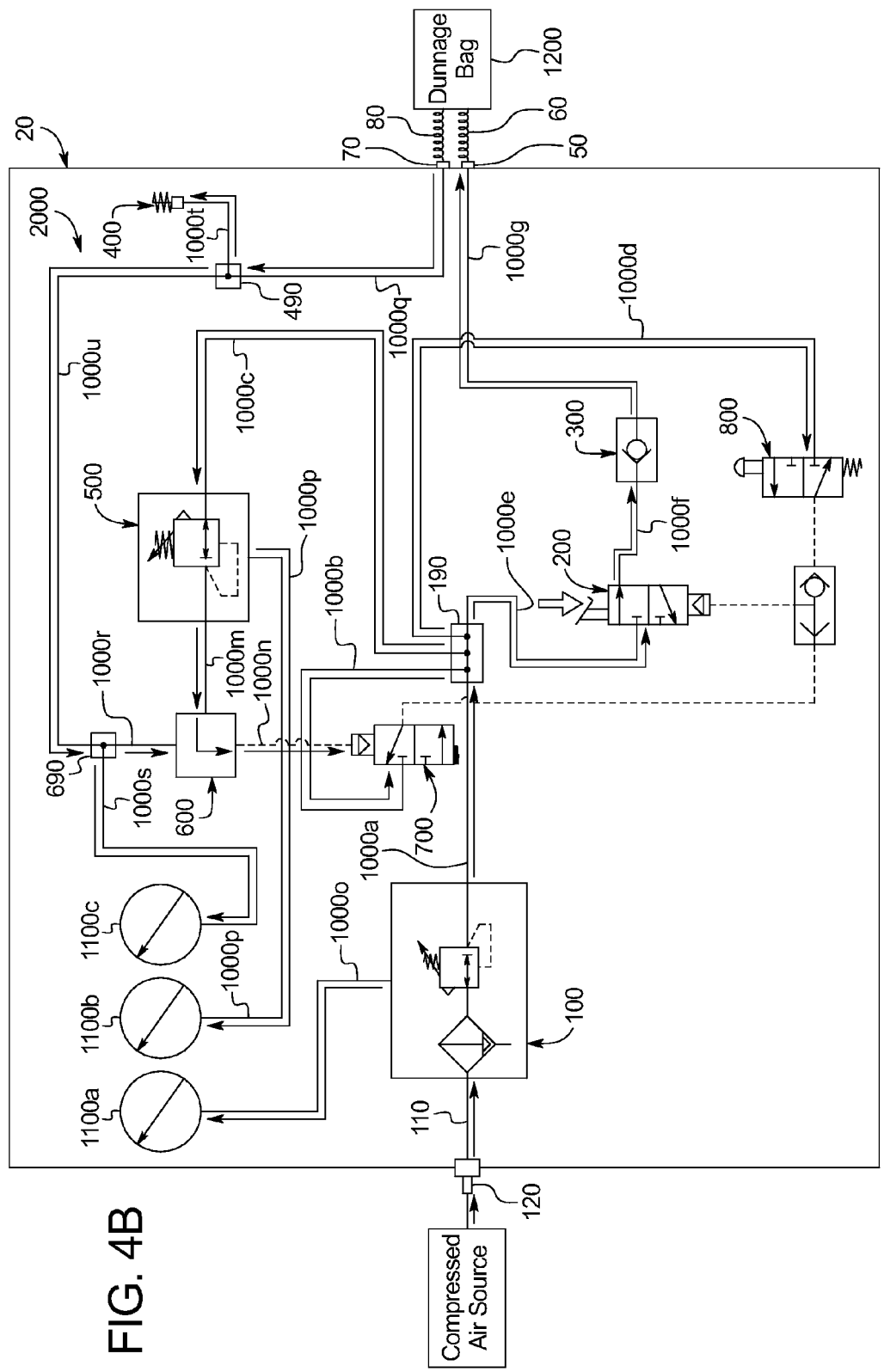

PNEUMATIC INFLATOR FOR AUTOMATICALLY INFLATING INFLATABLE ARTICLES TO A DESIRED PRESSURE

PRIORITY CLAIM

This application claims priority to and the benefit of U.S. Provisional Patent Application Ser. No. 62/018,911, filed on Jun. 30, 2014, the entire contents of which are incorporated herein by reference.

BACKGROUND

Inflatable dunnage bags are used to stabilize and limit movement of cargo during transportation of cargo containers (such as railroad cars and semi-trailers), which improves safety and reduces the likelihood of damage to the cargo in such cargo containers. Generally, after some or all of the cargo is loaded into a cargo container, one or more uninflated or partially inflated dunnage bags are positioned in any voids or spaces between the cargo and/or between the cargo and the walls of the cargo container. The dunnage bags are then inflated to a desired bag pressure using a compressed air source. In most known implementations in the load securement industry, a pneumatic compressor is employed as the compressed air source. This pneumatic compressor is typically a large-scale, stationary pneumatic compressor centrally located in the warehouse or factory from which the cargo is being transported.

Typically, an operator inflates a dunnage bag by: (1) transporting a compressor hose to the dunnage bag; (2) operatively connecting an inflation head of the compressor hose to the dunnage bag; (3) depressing a trigger of the compressor hose, which enables air to flow from the compressor hose into the dunnage bag to inflate the dunnage bag; and (4) releasing the trigger when the dunnage bag reaches a desired bag pressure. The inflation process typically takes one to three minutes per dunnage bag. The operator then removes the inflation head from the dunnage bag and repeats the process for any remaining dunnage bags.

This typical dunnage bag inflation process is problematic for multiple reasons. Requiring the operator to manually depress the trigger of the compressor hose for substantially the entire one to three minute inflation process results in a loss of productivity while the operator merely stands near the dunnage bag and depresses a trigger. Additionally, requiring the operator to manually depress the trigger of the compressor hose while standing near the dunnage bag is potentially dangerous for the operator, as inflation of the dunnage bag may cause cargo to shift and fall onto the operator. Further, the operator must constantly monitor the pressure inside the dunnage bag such that the operator does not overfill the dunnage bag, which could rupture the dunnage bag, render the dunnage bag more susceptible to rupturing during transit, or damage the cargo.

Accordingly, there is a need for a new and improved pneumatic inflator that solves these problems.

SUMMARY

Various embodiments of the present disclosure provide a pneumatic inflator for automatically inflating inflatable articles, such as dunnage bags, to a desired pressure. Generally, once activated, the pneumatic inflator of the present disclosure inflates an inflatable article via a compressed air source until the air pressure inside the inflatable article reaches an operator-selected desired pressure. Thereafter, the pneumatic inflator automatically stops inflating the inflatable article. In various embodiments, the pneumatic inflator also includes a manual shut-off that, when activated while the pneumatic inflator is inflating the inflatable article, causes the pneumatic inflator to stop inflating the inflatable article. The pneumatic inflator of the present disclosure thus enables automatic inflation of inflatable articles to particular, operated-selected desired pressures with limited operator input.

In one embodiment, the pneumatic inflator includes a housing and a first pressure regulator, an actuatable control valve, a normally open actuatable control valve, a second pressure regulator, and a pressure repeater each supported by the housing. A compressed air source is fluidically connectable to the first pressure regulator such that air may flow from the compressed air source to the first pressure regulator. The control valve is fluidically connectable to an inflation hose such that air may flow from the control valve to the inflation hose. A return air hose is fluidically connectable to the pressure repeater such that air may flow from the return air hose to the pressure repeater. In this embodiment, the first pressure regulator, the control valve, the normally open control valve, the second pressure regulator, and the pressure repeater are arranged such that, when the compressed air source is fluidically connected to the first pressure regulator, the control valve is fluidically connected to the inflation hose, and the return air hose is fluidically connected to the pressure repeater: (a) when: (i) air pressure inside the return air hose is greater than a desired air pressure set by the second pressure regulator, and (ii) the control valve is actuated from its closed position to its open position, air flows from the compressed air source into the inflation hose; and (b) thereafter, when the air pressure inside the return air hose exceeds the desired air pressure, the control valve is automatically actuated into its closed position, which stops the air flow from the compressed air source into the inflation hose.

In another embodiment, the pneumatic inflator includes a control valve including an air inlet, an air outlet, and an air pilot actuator; a normally open control valve including an air inlet, an air outlet, and an air pilot actuator; a pressure repeater including a first air inlet, a second air inlet, and an air outlet; a first pressure regulator including an air inlet and an air outlet; and a second pressure regulator including an air inlet and an air outlet. The control valve is fluidically connectable to an inflation hose such that air may flow from the air outlet of the control valve to the inflation hose. The normally open control valve is fluidically connected to the control valve such that air may flow from the air outlet of the normally open control valve to the air pilot actuator of the control valve. The pressure repeater is fluidically connected to the normally open control valve such that air may flow from the air outlet of the pressure repeater to the air pilot actuator of the normally open control valve, a return air hose being fluidically connectable to the pressure repeater such that air may flow from the return air hose to the first air inlet of the pressure repeater. The first pressure regulator is fluidically connected to the pressure repeater such that air may flow from the air outlet of the first pressure regulator to the second air inlet of the pressure repeater. The second pressure regulator is fluidically connected to: (a) the control valve such that air may flow from the air outlet of the second pressure regulator to the air inlet of the control valve, (b) the normally open control valve such that air may flow from the air outlet of the second pressure regulator to the air inlet of the normally open control valve, and (c) the first pressure regulator such that air may flow from the air outlet of the second pressure regulator to the air inlet of the first pressure regulator.

In another embodiment, the pneumatic inflator includes a control valve including an air inlet, an air outlet, and an air pilot actuator; a shuttle valve including a first air inlet, a second air inlet, and an air outlet; a normally open control valve including an air inlet, an air outlet, and an air pilot actuator; a normally closed control valve including an air inlet and an air outlet; a pressure repeater including a first air inlet, a second air inlet, and an air outlet; a first pressure regulator including an air inlet and an air outlet; and a second pressure regulator including an air inlet and an air outlet. The control valve is fluidically connectable to an inflation hose such that air may flow from the air outlet of the control valve to the inflation hose. The shuttle valve is fluidically connected to the control valve such that air may flow from the air outlet of the shuttle valve to the air pilot actuator of the control valve. The normally open control valve is fluidically connected to the shuttle valve such that air may flow from the air outlet of the normally open control valve to the first air inlet of the shuttle valve. The normally closed control valve is fluidically connected to the shuttle valve such that air may flow from the air outlet of the normally closed control valve to the second air inlet of the shuttle valve. The pressure repeater is fluidically connected to the normally open control valve such that air may flow from the air outlet of the pressure repeater to the air pilot actuator of the normally open control valve, a return air hose being fluidically connectable to the pressure repeater such that air may flow from the return air hose to the first air inlet of the pressure repeater. The first pressure regulator is fluidically connected to the pressure repeater such that air may flow from the air outlet of the first pressure regulator to the second air inlet of the pressure repeater. The second pressure regulator is fluidically connected to: (a) the control valve such that air may flow from the air outlet of the second pressure regulator to the air inlet of the control valve, (b) the normally open control valve such that air may flow from the air outlet of the second pressure regulator to the air inlet of the normally open control valve, (c) the first pressure regulator such that air may flow from the air outlet of the second pressure regulator to the air inlet of the first pressure regulator, and (d) the normally closed control valve such that air may flow from the air outlet of the second pressure regulator to the air inlet of the normally closed control valve.

The pneumatic inflator of the present disclosure solves the above-described problems. More specifically, since the pneumatic inflator of the present disclosure inflates the dunnage bag until the air pressure inside the dunnage bag reaches the desired bag pressure, at which point the pneumatic inflator automatically stops inflating the dunnage bag, the operator need not manually depress a trigger of a compressed air hose for the entire inflation process as in typical dunnage bag inflation processes. This increases productivity and enables the operator to perform other tasks after the operator activates the pneumatic inflator.

Additionally, since the pneumatic inflator of the present disclosure inflates the dunnage bag until the air pressure inside the dunnage bag reaches the desired bag pressure, at which point the pneumatic inflator automatically stops inflating the dunnage bag, the operator need not stand near the dunnage bag to manually depress a trigger of a compressed air hose for the entire inflation process as in typical dunnage bag inflation processes. This enables the operator to stand safely away from the dunnage bag and the cargo, which greatly reduces or eliminates the likelihood that any cargo will shift and fall onto the operator.

Further, since the pneumatic inflator of the present disclosure inflates the dunnage bag until the air pressure inside the dunnage bag reaches the desired bag pressure, at which point the pneumatic inflator automatically stops inflating the dunnage bag, the operator need not constantly monitor the pressure inside the dunnage bag during the entire inflation process. Additionally, since the pneumatic inflator of the present disclosure automatically stops inflating the dunnage bag when the air pressure inside the dunnage bag reaches the desired bag pressure, the likelihood that the dunnage bag will rupture or be overfilled is greatly reduced or eliminated.

Additional features and advantages of the present disclosure are described in, and will be apparent from, the following Detailed Description and the Figures.

BRIEF DESCRIPTION OF THE DRAWINGS

FIG. 4B is a pneumatic circuit diagram of the pneumatic inflator of FIG. 1A after the foot pedal actuator of the control valve has been actuated at a point when the air pressure inside the dunnage bag is less than the desired dunnage bag air pressure.

DETAILED DESCRIPTION

Figure 1A:
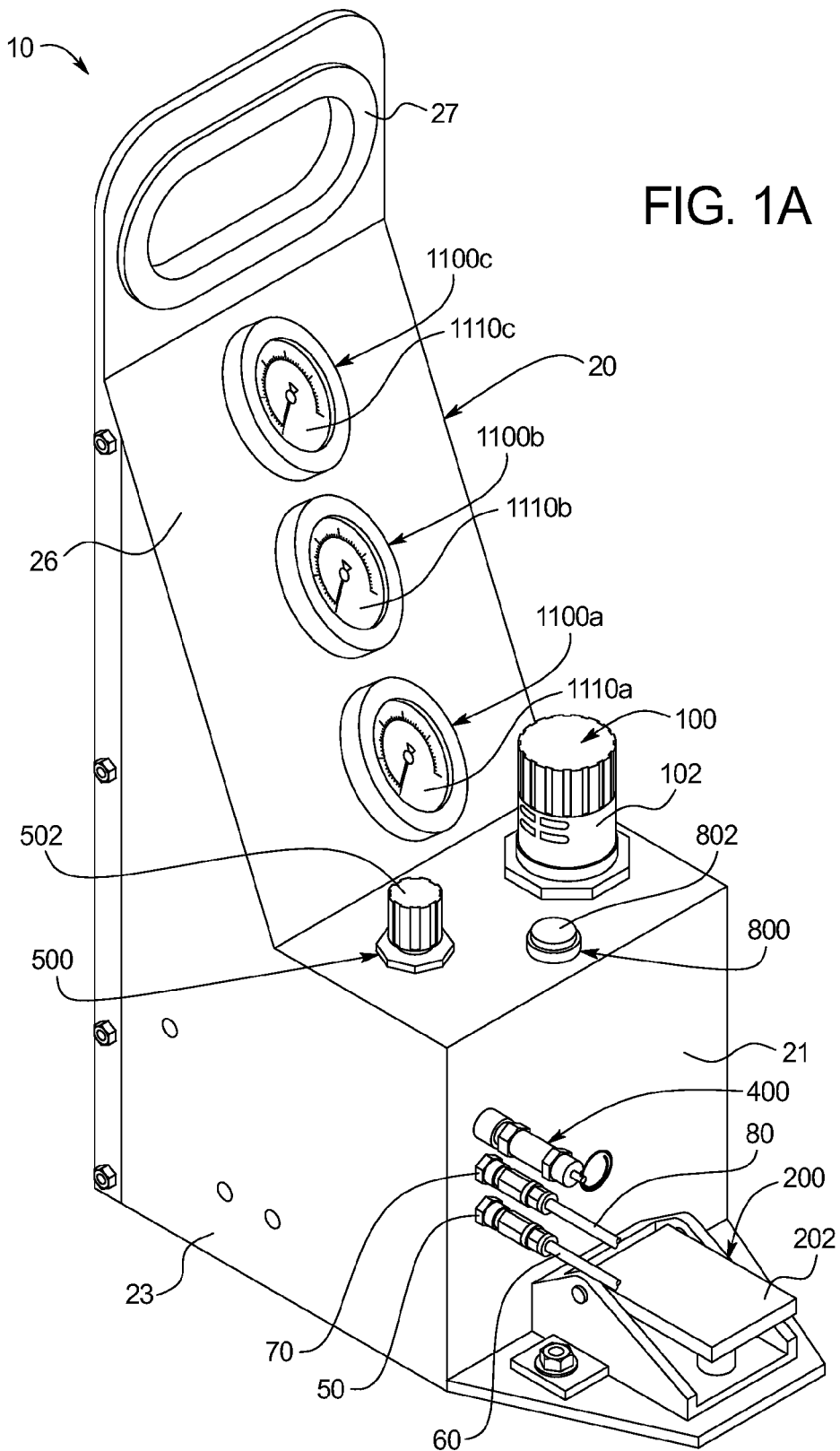
FIG. 1A is a top front left perspective view of one embodiment of the pneumatic inflator of the present disclosure.

Various embodiments of the present disclosure provide a pneumatic inflator for automatically inflating inflatable articles, such as dunnage bags, to a desired pressure. Generally, once activated, the pneumatic inflator of the present disclosure inflates an inflatable article via a compressed air source until the air pressure inside the inflatable article reaches an operator-selected desired pressure. Thereafter, the pneumatic inflator automatically stops inflating the inflatable article. In various embodiments, the pneumatic inflator also includes a manual shut-off that, when activated while the pneumatic inflator is inflating the inflatable article, causes the pneumatic inflator to stop inflating the inflatable article. The pneumatic inflator of the present disclosure thus enables automatic inflation of inflatable articles to particular, operated-selected desired pressures with limited operator input.

While the pneumatic inflator has been described herein as being used to inflate dunnage bags, it should be appreciated that the pneumatic inflator may be employed to inflate any other suitable inflatable articles such as, but not limited to: bags other than dunnage bags, air mattresses, rafts, tires, structures, and/or boats.

Pneumatic Inflator Components

In this illustrated embodiment, as best shown in FIGS. 1A, 1B, 1C, 1D, 1E, 1F, 1G, and 1H, the pneumatic inflator, which is generally indicated by numeral 10, includes a housing 20 including: (a) a front panel 21 having an exterior surface and an interior surface, (b) a removable back panel 22 opposite the front panel 21 and having an exterior surface and an interior surface, (c) a first side panel 23 having an exterior surface and an interior surface, (d) a second side panel 24 opposite the first side panel 23 and having an exterior surface and an interior surface, (e) a bottom panel 25 having an exterior surface and an interior surface, (f) a top panel 26 opposite the bottom panel 25 and having an exterior surface and an interior surface, and (g) a handle 27 extending from the top panel 26. It should be appreciated that the housing (and its housing components) is one example of a variety of different housings (and housing components) that the pneumatic inflator may employ.

As best shown in FIGS. 1A to 1H, 2, and 3, the pneumatic inflator 10 also includes the following components that are supported by the housing 20: (a) a pressure filter regulator and automatic water drain 100 (sometimes referred to herein as the pressure filter regulator 100) that includes a pressure regulating knob 102, an integrated air filter (not shown), an integrated condensate drainer (not shown), an air inlet (not labeled for clarity), an air outlet (not labeled for clarity), a pressure gauge air outlet (not labeled for clarity), and a water outlet (not labeled for clarity); (b) a foot pedal actuated control valve with air pilot actuated return 200 (sometimes referred to herein as the control valve 200) that includes a foot pedal actuator 202, an air pilot actuator (not shown), an air inlet (not labeled for clarity), and an air outlet (not labeled for clarity); (c) a check valve 300 that includes an air inlet (not labeled for clarity) and an air outlet (not labeled for clarity); (d) a safety valve 400 that includes an air inlet (not labeled for clarity), one or more relief ports (not shown), and a manual relief ring (not shown); (e) a set desired bag pressure regulator 500 (sometimes referred to herein as the pressure regulator 500) that includes a pressure regulating knob 502, an air inlet (not labeled for clarity), an air outlet (not labeled for clarity), and a pressure gauge air outlet (not labeled for clarity); (f) a pressure repeater 600 that includes a first air inlet (not labeled for clarity), a second air inlet (not labeled for clarity), and an air outlet (not labeled for clarity); (g) a normally open air pilot actuated control valve with spring return 700 (sometimes referred to herein as the normally open control valve 700) that includes an air inlet (not labeled for clarity), an air outlet (not labeled for clarity), and an air pilot actuator 702; (h) a normally closed push button actuated control valve with spring return 800 (sometimes referred to herein as the normally closed control valve 800) that includes an air inlet (not labeled for clarity), an air outlet (not labeled for clarity), and a push button actuator 802; (i) a shuttle valve 900 that includes a first air inlet (not labeled for clarity), a second air inlet (not labeled for clarity), and an air outlet (not labeled for clarity); (j) an incoming air pressure gauge 1100a that includes an air inlet (not labeled for clarity) and a dial 1110a; (k) a desired bag pressure gauge 1100b that includes an air inlet (not labeled for clarity) and a dial 1110b; and (l) an actual bag pressure gauge 1100c that includes an air inlet (not labeled for clarity) and a dial 1110c.

Figure 3:
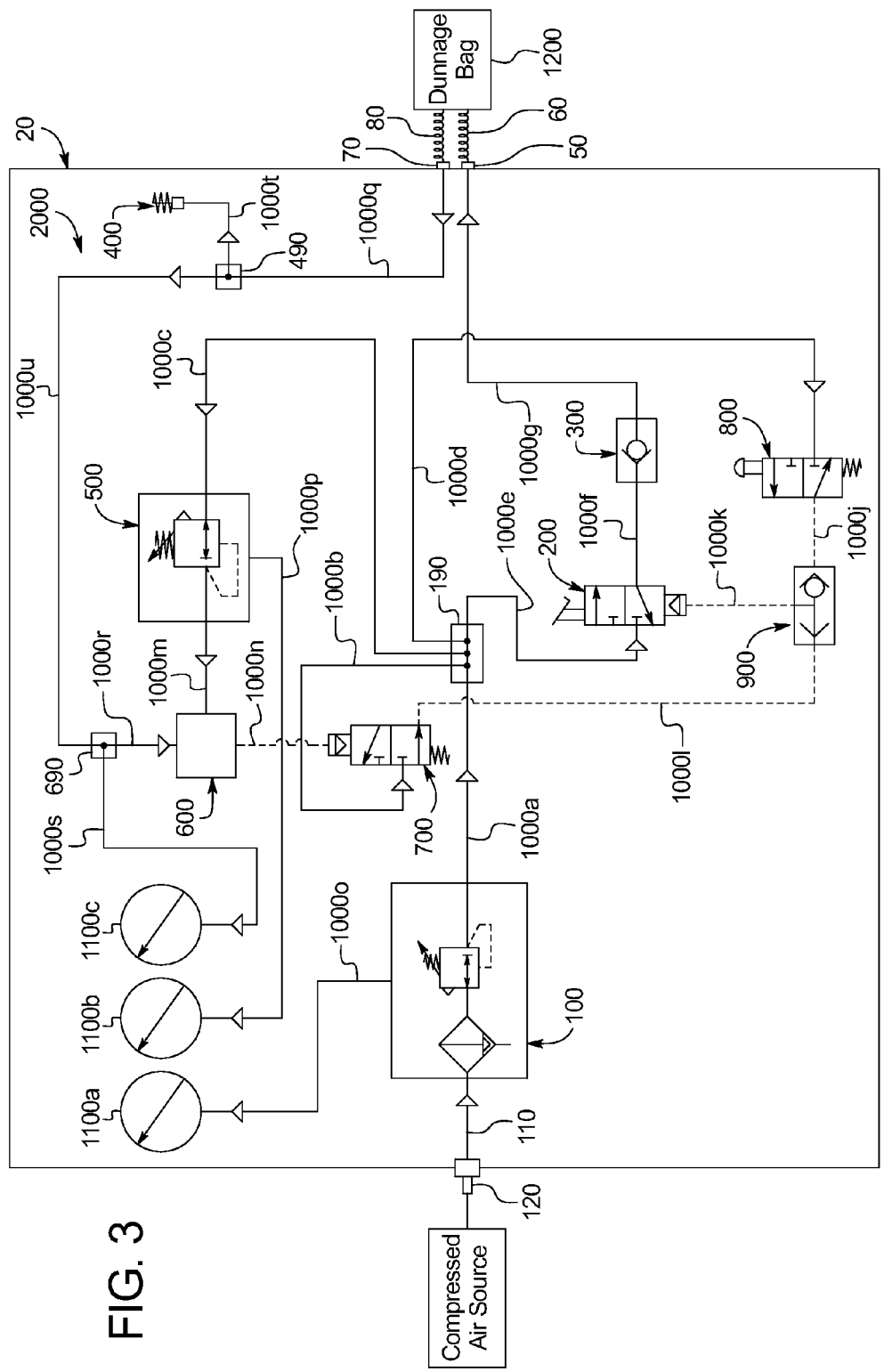
FIG. 3 is a pneumatic circuit diagram of the pneumatic circuit of the pneumatic inflator of FIG. 1A.

It should be appreciated that the symbols that represent the various components of the pneumatic inflator shown in FIG. 3 are merely example representative symbols, and should not be considered to in any way limit the corresponding components of the pneumatic inflator.

Figure 2:
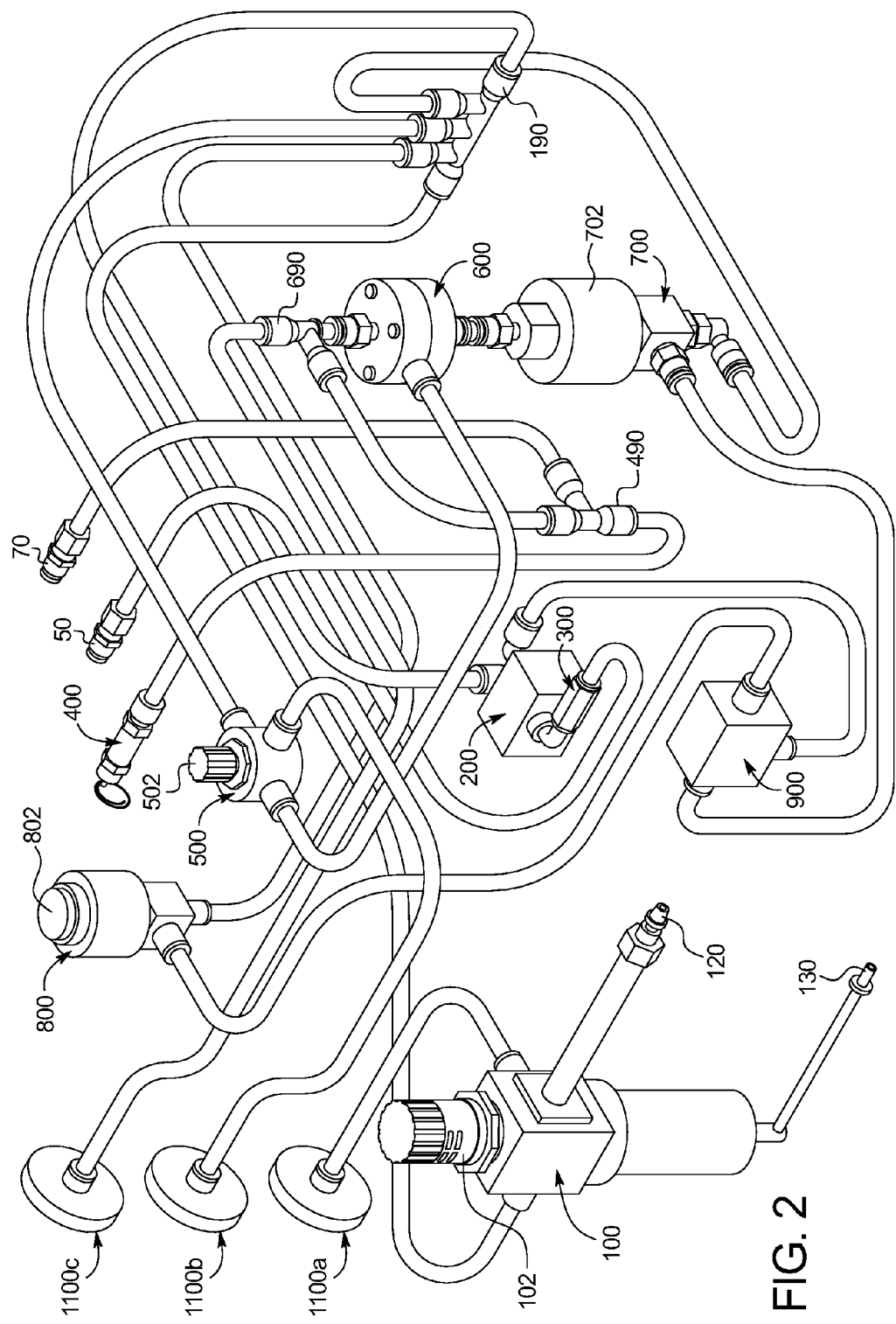
FIG. 2 is a top perspective view of certain components of the pneumatic inflator of FIG. 1A removed from the housing.

As best shown in FIGS. 2 and 3, the certain components of the pneumatic inflator 10 are fluidically connected to certain other components of the pneumatic inflator 10 via one or more working lines and/or pilot lines 1000. In this example embodiment, the working lines and the pilot lines include flexible tubing, though it should be appreciated that any suitable line, hose, or tubing may be employed to fluidically connect the components to one another. It should be appreciated from FIG. 2 that the pneumatic inflator 10 includes a plurality of fittings and connectors configured to facilitate the connection of the working lines and the pilot lines to the various components of the pneumatic inflator 10 such that the various components are fluidically connected to one another. Certain such fittings and connectors are not described or labeled herein for brevity and clarity.

As used herein, when a first component is described as being "directly fluidically connected" to a second component, those two components are fluidically connected such that air can flow from the first component to the second component without flowing through any other component in between that can stop that flow of air from the first component to the second component. For example, if a first control valve and a second control valve are fluidically connected such that air can flow from the first control valve to the second control valve without flowing through any other component in between that can stop the flow of air from the first control valve to the second control valve, the first control valve is directly fluidically connected to the second control valve.

In another example, if a first control valve and a second control valve are fluidically connected such that air can flow from the first control valve to and through a check valve and from the check valve to the second control valve, the first control valve is directly fluidically connected to the second control valve because the check valve cannot stop the flow of air from the first control valve to the second control valve. The check valve can, however, prevent back flow from the second control valve to the first control valve.

In another example, if a first control valve and a second control valve are fluidically connected such that air can flow from the first control valve to and through a tee fitting and from the tee fitting to the second control valve and another valve, the first control valve is directly fluidically connected to the second control valve because the tee fitting cannot stop the flow of air from the first control valve to the second control valve. The tee fitting simply directs air from the first control valve to the other valve in addition to the second control valve.

In another example, if a first control valve and a second control valve are fluidically connected such that air can flow from the first control valve to and through a pressure regulator and from the pressure regulator to the second control valve, the first control valve is not directly fluidically connected to the second control valve because the pressure regulator can stop the flow of air from the first control valve to the second control valve.

In another example, if a first control valve and a second control valve are fluidically connected such that air can flow from the first control valve to and through a third control valve and from the third control valve to the second control valve, the first control valve is not directly fluidically connected to the second control valve because the third control valve can stop the flow of air from the first control valve to the second control valve.

In another example, if a first control valve and a second control valve are fluidically connected such that air can flow from the first control valve to and through a shuttle valve and from the shuttle valve to the second control valve, the first control valve is not directly fluidically connected to the second control valve because the shuttle valve can stop the flow of air from the first control valve to the second control valve.

In another example, if a first control valve and a second control valve are fluidically connected such that air can flow from the first control valve to and through a pressure repeater and from the pressure repeater to the second control valve, the first control valve is not directly fluidically connected to the second control valve because the pressure repeater can stop the flow of air from the first control valve to the second control valve.

As used herein, when a first component is described as being "indirectly fluidically connected" to a second component, those two components are fluidically connected such that air can flow from the first component to at least one other component that can stop the flow of air, and from the at least one other component to the second component. For example, if a first control valve and a second control valve are fluidically connected such that air can flow from the first control valve to a component that can stop the flow of air and from that component to the second control valve, the first control valve is indirectly fluidically connected to the second control valve.

In another example, if a first control valve and a second control valve are fluidically connected such that air can flow from the first control valve to and through a check valve and from the check valve to the second control valve, the first control valve is not indirectly fluidically connected to the second control valve because the check valve cannot stop the flow of air from the first control valve to the second control valve. Rather, as noted above, the first control valve is directly fluidically connected to the second control valve in this example.

In another example, if a first control valve and a second control valve are fluidically connected such that air can flow from the first control valve to and through a tee fitting and from the tee fitting to the second control valve and another valve, the first control valve is not indirectly fluidically connected to the second control valve because the tee fitting cannot stop the flow of air from the first control valve to the second control valve. Rather, as noted above, the first control valve is directly fluidically connected to the second control valve in this example because the tee fitting simply directs air from the first control valve to the other valve in addition to the second control valve.

In another example, if a first control valve and a second control valve are fluidically connected such that air can flow from the first control valve to and through a pressure regulator and from the pressure regulator to the second control valve, the first control valve is indirectly fluidically connected to the second control valve because the pressure regulator can stop the flow of air from the first control valve to the second control valve.

In another example, if a first control valve and a second control valve are fluidically connected such that air can flow from the first control valve to and through a third control valve and from the third control valve to the second control valve, the first control valve is indirectly fluidically connected to the second control valve because the third control valve can stop the flow of air from the first control valve to the second control valve.

In another example, if a first control valve and a second control valve are fluidically connected such that air can flow from the first control valve to and through a shuttle valve and from the shuttle valve to the second control valve, the first control valve is indirectly fluidically connected to the second control valve because the shuttle valve can stop the flow of air from the first control valve to the second control valve.

In another example, if a first control valve and a second control valve are fluidically connected such that air can flow from the first control valve to and through a pressure repeater and from the pressure repeater to the second control valve, the first control valve is indirectly fluidically connected to the second control valve because the pressure repeater can stop the flow of air from the first control valve to the second control valve.

As used herein, when two components of the pneumatic inflator are described as being "fluidically connected," those two components may be either directly or indirectly fluidically connected, depending on the configuration of the pneumatic circuit of the pneumatic inflator.

In this example embodiment, as best shown in FIG. 1A, the pressure filter regulator 100 is supported by the housing 20 such that the knob 102 protrudes through an opening defined through the top panel 26 of the housing 20. This enables an operator to rotate the knob 102 to cause the pressure filter regulator 100 to change the pressure of the air flowing through the pressure filter regulator 100 (as described below). The pressure filter regulator 100 is configured to receive incoming air through the air inlet, filter the air, change the pressure of the air to the set pressure (if applicable), remove any water from the incoming air and expel the removed water from the water outlet, and expel the air from the air outlet and the pressure gauge air outlet.

Figure 1B:
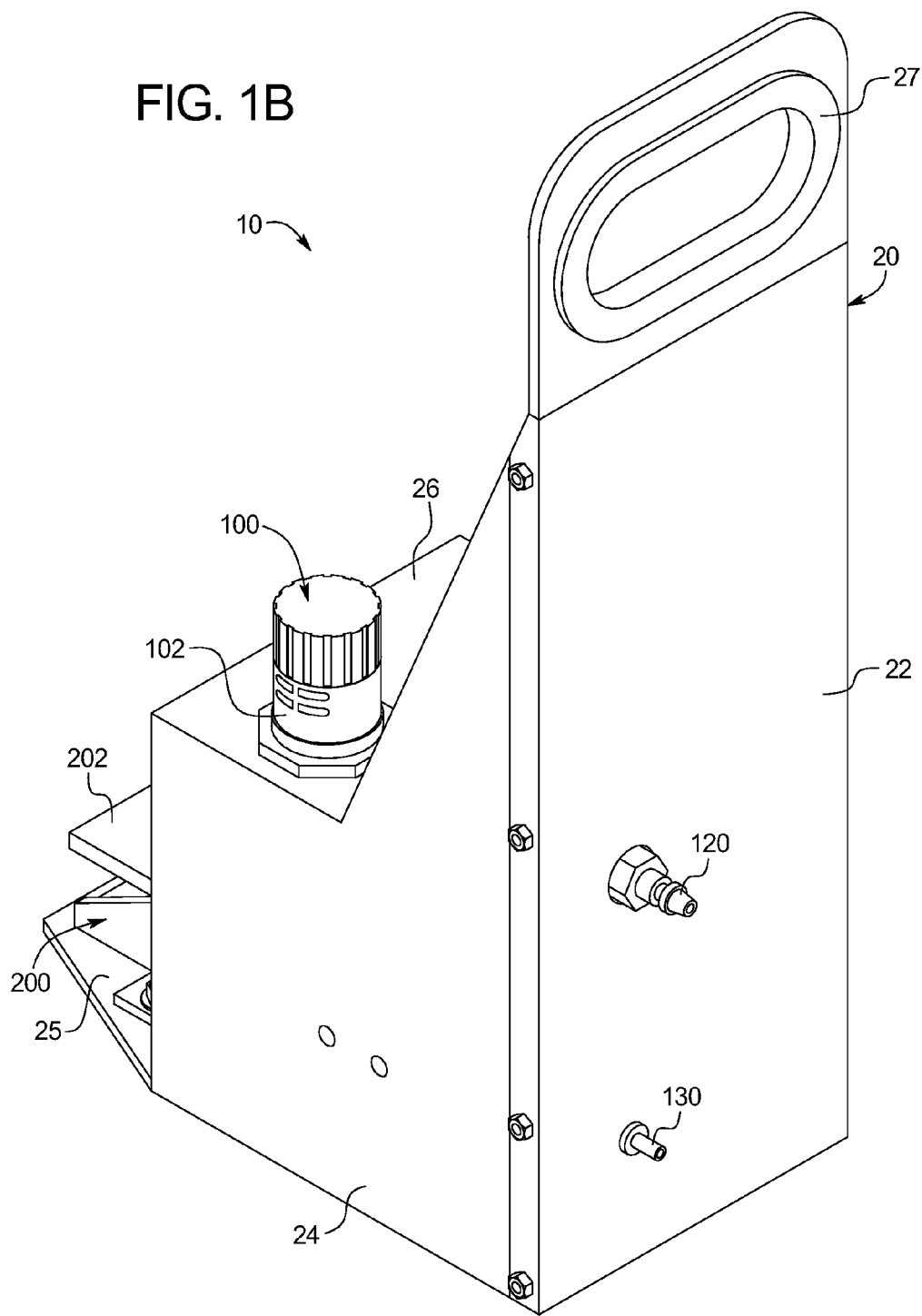
FIG. 1B is a top back right perspective view of the pneumatic inflator of FIG. 1A.
Figure 1C:
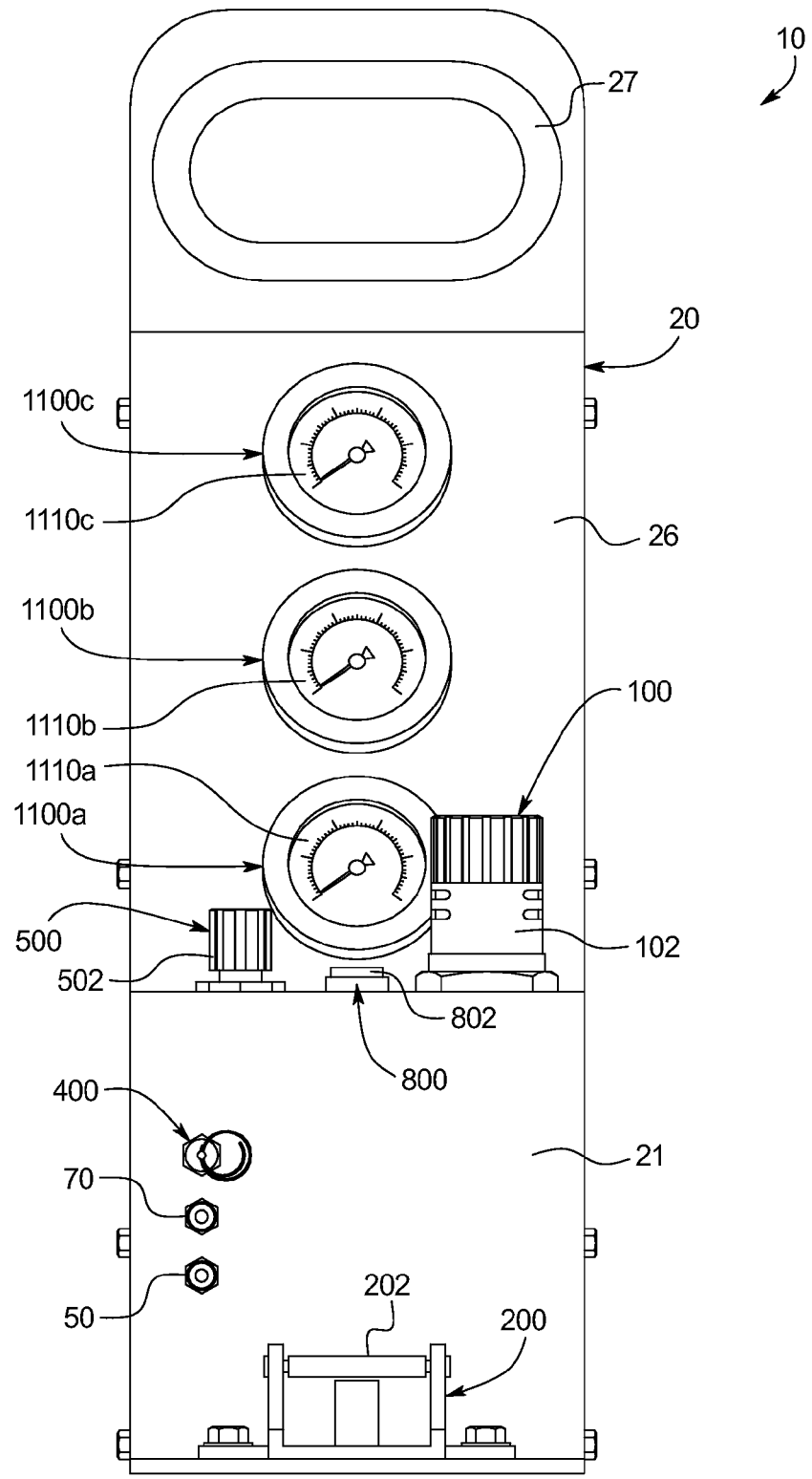
FIG. 1C is a front view of the pneumatic inflator of FIG. 1A.
Figure 1D:
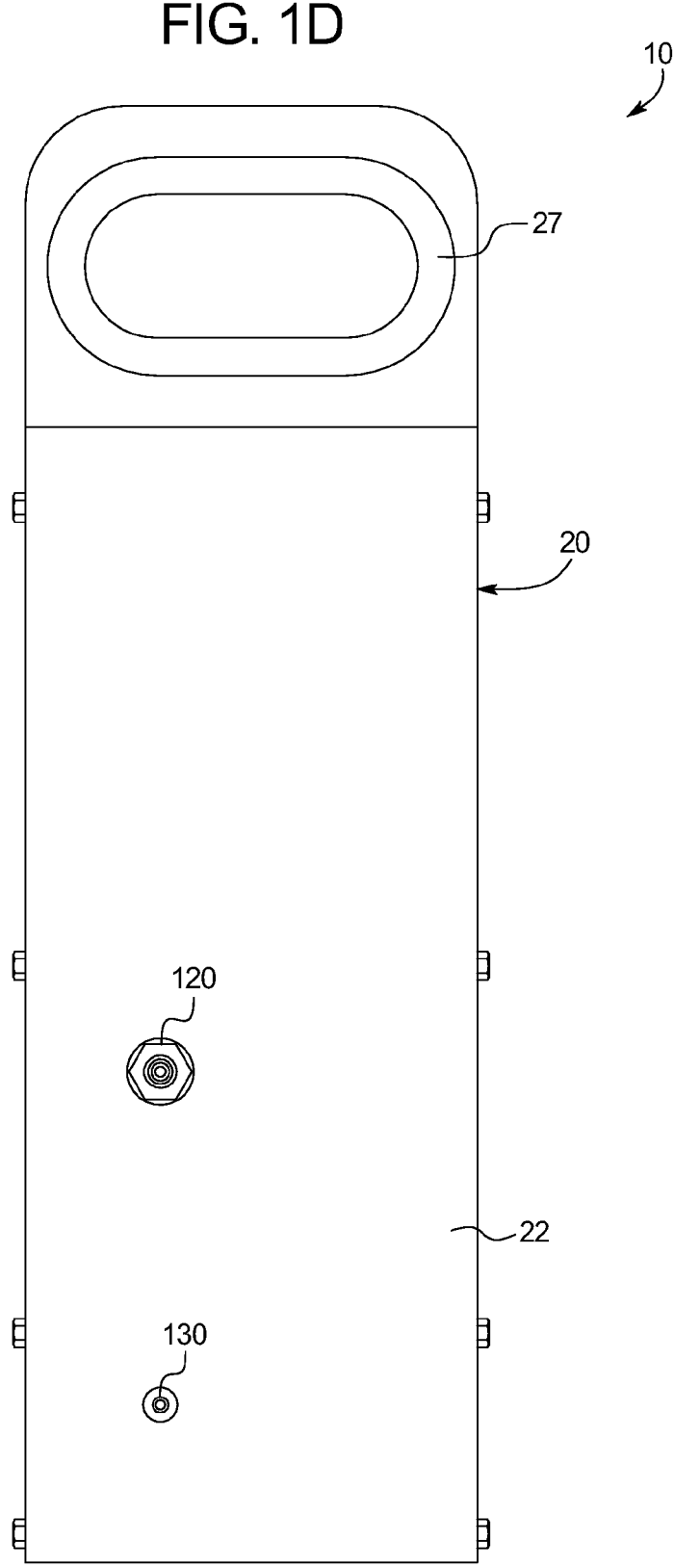
FIG. 1D is a back view of the pneumatic inflator of FIG. 1A.
Figure 1E:
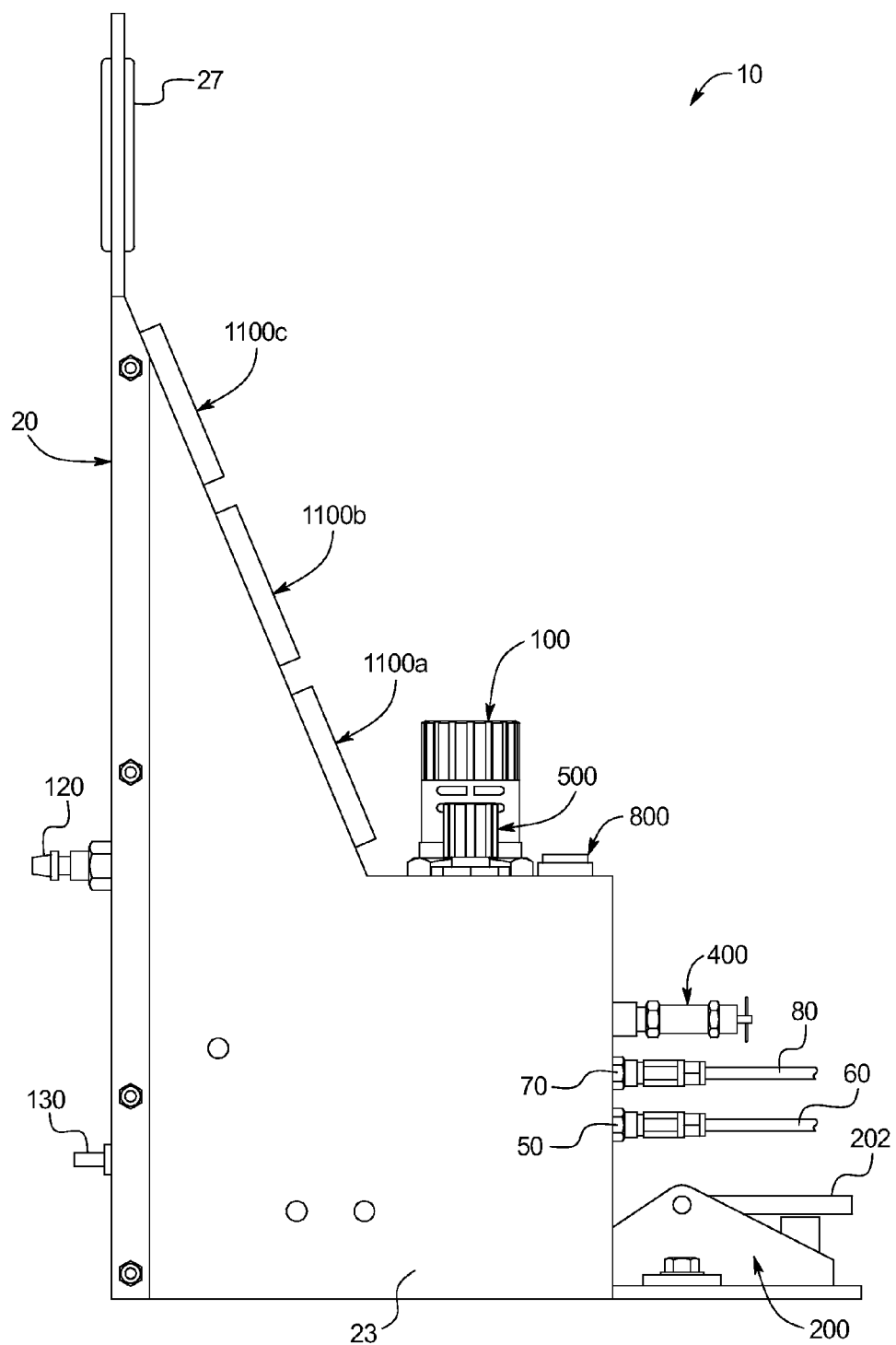
FIG. 1E is a left side view of the pneumatic inflator of FIG. 1A.
Figure 1F:
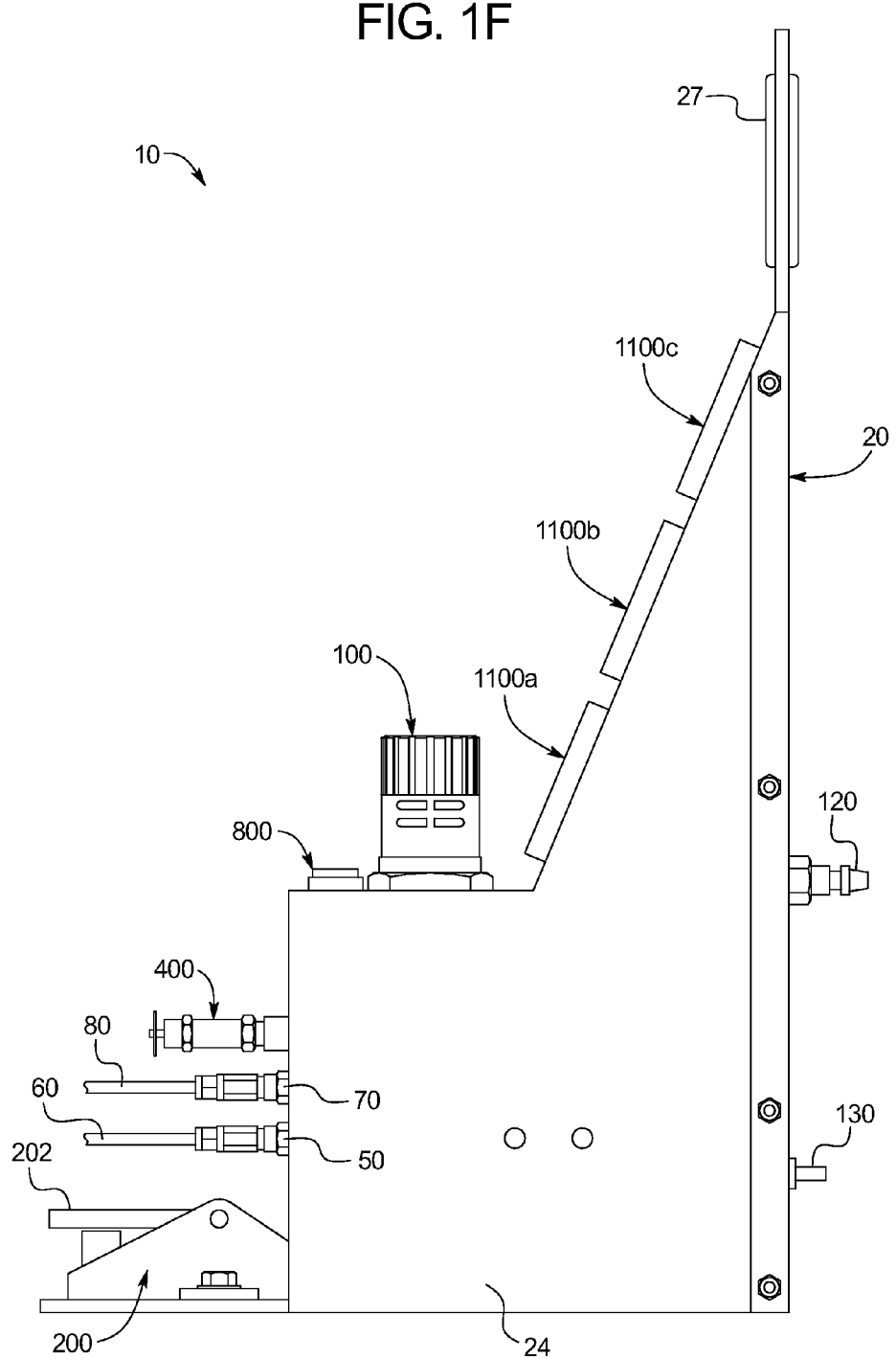
FIG. 1F is a right side view of the pneumatic inflator of FIG. 1A.
Figure 1G:
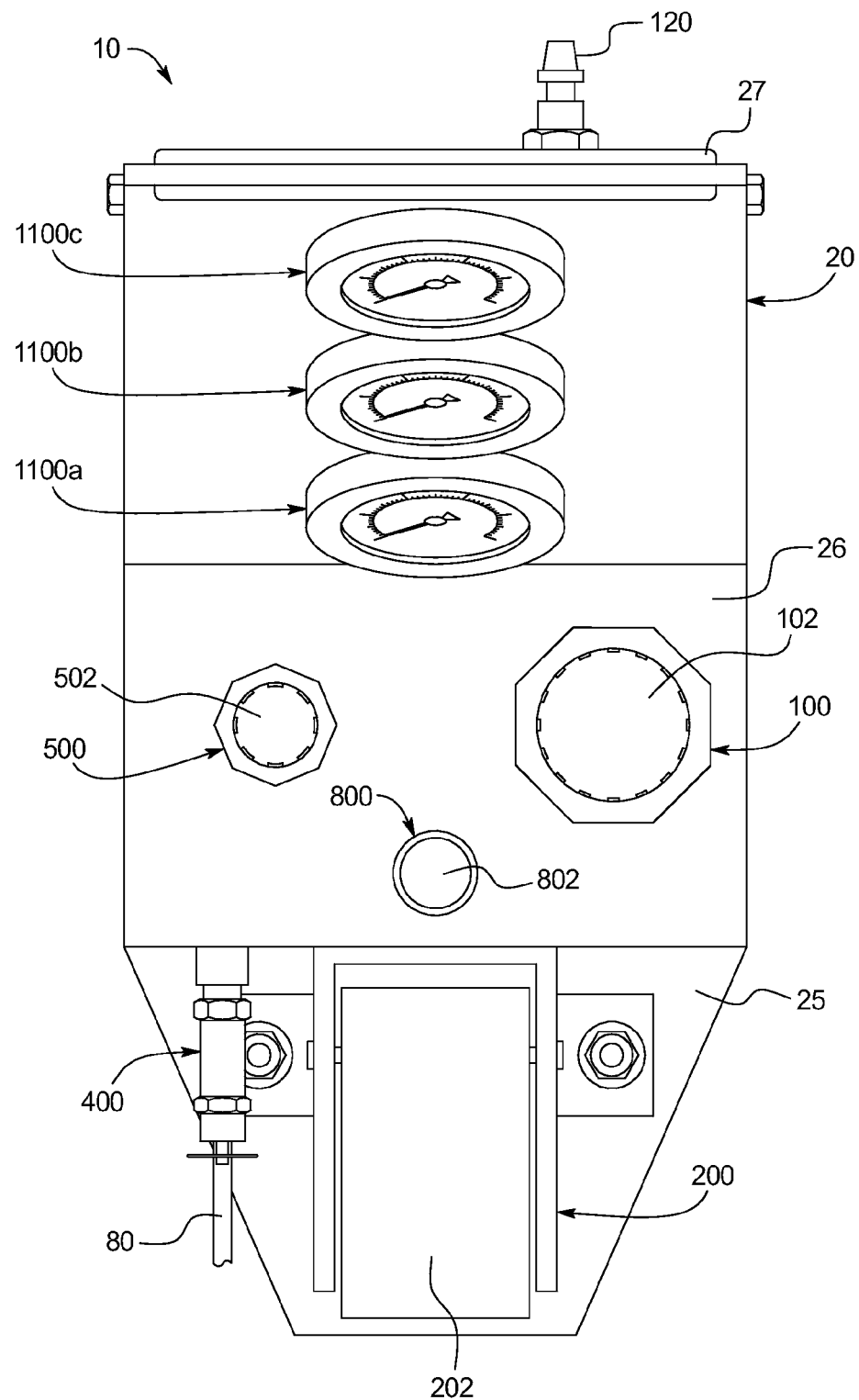
FIG. 1G is a top view of the pneumatic inflator of FIG. 1A.
Figure 1H:
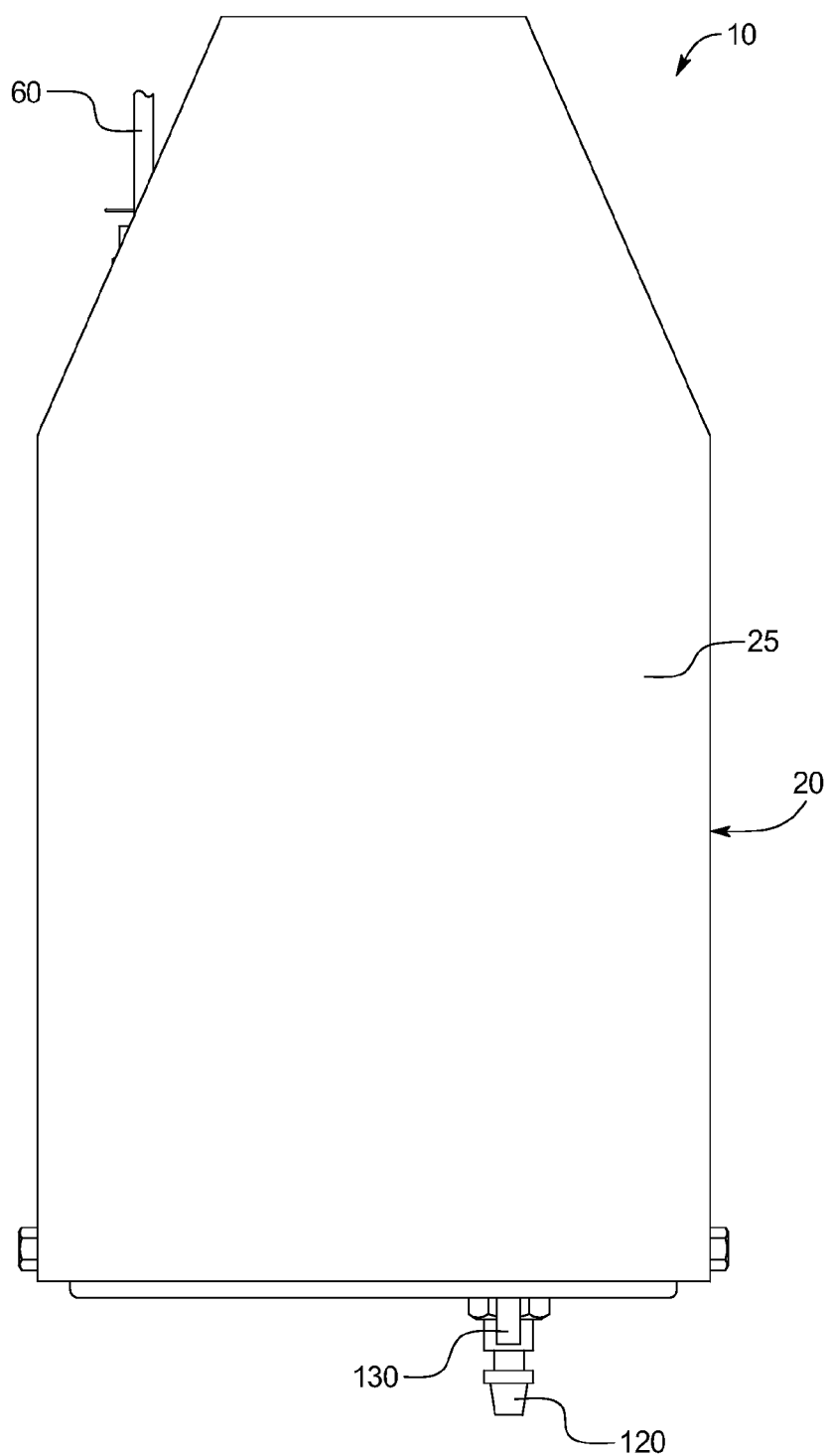
FIG. 1H is a bottom view of the pneumatic inflator of FIG. 1A.

In this example embodiment, a coupling 120 is fluidically connected to the air inlet of the pressure filter regulator 100 via an incoming air line 110. The coupling 120 is configured to connect to a corresponding coupling of a hose fluidically connected to a compressed air supply (such as a compressor). As best shown in FIG. 1B, at least part of the coupling 120 protrudes through an opening defined through the back panel 22 of the housing 20 to enable an operator to easily connect the coupling of the hose of the compressed air supply to the coupling 120 of the pneumatic inflator 10. Once the coupling of the hose of the compressed air supply and the coupling 120 are connected, the compressed air supply is fluidically connected to the air inlet of the pressure filter regulator 100. This enables air to flow from the compressed air supply to the air inlet of the pressure filter regulator 100 via the hose of the compressed air supply and the incoming air line 110.

As best shown in FIG. 1B, the water outlet of the pressure filter regulator 100 is fluidically connected to a first end of a water drain line 130 such that water may flow from the water outlet of the pressure filter regulator 100 through the water drain line 130. A second end of the water drain line 130 protrudes through an opening defined through the back panel 22. This ensures that any water drained from the incoming air is expelled outside of the enclosure formed by the interior surfaces of the various panels of the housing 20 and away from the components of the pneumatic inflator 10.

In this example embodiment: (a) the pressure filter regulator 100 is fluidically connected to the incoming air pressure gauge 1100a via working line 1000o such that air may flow from the pressure gauge air outlet of the pressure filter regulator 100 to the air inlet of the incoming air pressure gauge 1100a via the working line 1000o, (b) the pressure filter regulator 100 is fluidically connected to the normally open control valve 700 via working line 1000a and working line 1000b such that air may flow from the air outlet of the pressure filter regulator 100 to the air inlet of the normally open control valve 700 via the working lines 1000a and 1000b, (c) the pressure filter regulator 100 is fluidically connected to the pressure regulator 500 via the working line 1000a and working line 1000c such that air may flow from the air outlet of the pressure filter regulator 100 to the air inlet of the pressure filter regulator 500 via the working lines 1000a and 1000c, (d) the pressure filter regulator 100 is fluidically connected to the normally closed control valve 800 via the working line 1000a and working line 1000d such that air may flow from the air outlet of the pressure filter regulator 100 to the air inlet of the normally closed control valve 800 via the working lines 1000a and 1000d, and (e) the pressure filter regulator 100 is fluidically connected to the control valve 200 via the working line 1000a and working line 1000e such that air may flow from the air outlet of the pressure filter regulator 100 to the air inlet of the control valve 200 via the working lines 1000a and 1000e.

As best shown in FIG. 1A, the top panel 26 of the housing 20 supports the incoming air pressure gauge 1100a such that the dial 1110a of the incoming air pressure gauge 1100a is viewable from the exterior of the housing 20.

In this example embodiment, the pneumatic inflator includes a multiple tee fitting 190 that directs air from the working line 1000a to the working lines 1000b, 1000c, 1000d, 1000e, and 1000o. In one example embodiment, the multiple tee fitting is a Multiple Tee Fitting available from Parker Hannifin Corporation as Part No. 24PLP-6-4. The pneumatic inflator may include any suitable component (such as any suitable multiple tee fitting) configured to direct air from the working line 1000a to the working lines 1000b, 1000c, 1000d, 1000e, and 1000o.

In this example embodiment, the control valve 200 is fluidically connected to the check valve 300 via working line 1000f such that air may flow from the air outlet of the control valve 200 to the air inlet of the check valve 300 via the working line 1000f.

In this example embodiment, the air outlet of the check valve 300 is fluidically connected to a working line 1000g that terminates in a coupling 50 that is configured to connect to a corresponding coupling of an inflation hose 60 (described below). As best shown in FIG. 1A, the coupling 50 is supported by the front panel 21 of the housing 20. Once the coupling 50 and the corresponding coupling of the inflation hose 60 are connected, the check valve 300 is fluidically connected to the inflation hose 60 via the working line 1000g such that air may flow from the air outlet of the check valve 300 to and through the inflation hose 60 via the working line 1000g.

In this example embodiment, as best shown in FIG. 1A, the pressure regulator 500 is supported by the housing 20 such that the knob 502 protrudes through an opening defined through the top panel 26 of the housing 20. This enables an operator to rotate the knob 502 to cause the pressure regulator 500 to change the pressure of the air flowing through the pressure regulator 500 (as described below). The pressure regulator 500 is configured to receive incoming air through the air inlet, change the pressure of the air to the set pressure (if applicable), and expel the air through the pressure gauge air outlet and the air outlet.

In this example embodiment: (a) the pressure regulator 500 is fluidically connected to the pressure repeater 600 via working line 1000m such that air may flow from the air outlet of the pressure regulator 500 to the first air inlet of the pressure repeater 600 via the working line 1000m, and (b) the pressure regulator 500 is fluidically connected to the desired bag pressure gauge 1100b via working line 1000p such that air may flow from the pressure gauge air outlet of the pressure regulator 500 to the air inlet of the desired bag pressure gauge 1100b via the working line 1000p.

As best shown in FIG. 1A, the top panel 26 of the housing 20 supports the desired bag pressure gauge 1100b such that the dial 1110b of the desired bag pressure gauge 1100b is viewable from the exterior of the housing 20.

In this example embodiment, the pressure repeater 600 is fluidically connected to the normally open control valve 700 via pilot line 1000n such that air may flow from the air outlet of the pressure repeater 600 to the air pilot actuator 702 of the normally open control valve 700 via the pilot line 1000n (to cause the air pilot actuator 702 of the normally open control valve 700 to actuate the normally open control valve 700 (as described below)).

In this example embodiment, the normally open control valve 700 is fluidically connected to the shuttle valve 900 via pilot line 1000l such that air may flow from the air outlet of the normally open control valve 700 to the first air inlet of the shuttle valve 900 via the pilot line 1000l.

In this example embodiment, as best shown in FIG. 1A, the normally closed control valve 800 is supported by the housing 20 such that the push button actuator 802 protrudes through an opening defined through the top panel 26 of the housing 20. This enables an operator to actuate (i.e., press) the push button actuator 802 to actuate the normally closed control valve 800 to shift the normally closed control valve 800 from its normally closed position to its open position (as described below). In this example embodiment, the normally closed control valve 800 is fluidically connected to the shuttle valve 900 via pilot line 1000j such that air may flow from the air outlet of the normally closed control valve 800 to the second air inlet of the shuttle valve 900 via the pilot line 1000j.

In this example embodiment, the shuttle valve 900 is fluidically connected to the control valve 200 via pilot line 1000k such that air may flow from the air outlet of the shuttle valve 900 to the air pilot actuator of the control valve 200 via the pilot line 1000k (to cause the air pilot return actuator of the control valve 200 to actuate the control valve 200 (as described below)).

In this example embodiment, a working line 1000q terminates in a coupling 70 that is configured to connect to a corresponding coupling of a return air hose 80 (described below). As best shown in FIG. 1A, the coupling 70 is supported by the front panel 21 of the housing 20. Once the coupling 70 and the corresponding coupling of the return air hose 80 are connected, the return air hose 80 is fluidically connected to the working line 1000$q$ such that air may flow from the return air hose 80 to and through the working line 1000$q$.

In this example embodiment: (a) the working line 1000$q$ is fluidically connected to the safety valve 400 via working line 1000$t$ such that air may flow from the working line 1000$q$ to the air inlet of the safety valve 400 via the working line 1000$t$; (b) the working line 1000$q$ is fluidically connected to the pressure repeater 600 via working line 1000$u$ and working line 1000$r$ such that air may flow from the working line 1000$q$ to the second air inlet of the pressure repeater 600 via the working lines 1000$u$ and 1000$r$; and (c) the working line 1000$q$ is fluidically connected to the actual bag pressure gauge 1100$c$ via the working line 1000$u$ and working line 1000$s$ such that air may flow from the working line 1000$q$ to the air inlet of the actual bag pressure gauge 1100$c$ via the working lines 1000$u$ and 1000$s$.

The pneumatic inflator includes a tee fitting 490 configured to direct air from the working line 1000$q$ to the working lines 1000$u$ and 1000$t$. In one example embodiment, the tee fitting 490 is a Push-to-Connect Tube Fitting available from McMaster-Carr Supply Company as Part No. 5779K34. The pneumatic inflator may include any suitable component (such as any suitable tee fitting) to direct air from the working line 1000$q$ to the working lines 1000$u$ and 1000$t$.

The pneumatic inflator includes a tee fitting 690 configured to direct air flow from the working line 1000$u$ to the working lines 1000$r$ and 1000$s$. In one example embodiment, the tee fitting 690 is a Tee Fitting available from Parker Hannifin Corporation as Part No. 371PLPSP-4. The pneumatic inflator may include any suitable component (such as any suitable tee fitting) to direct air flow from the working line 1000$u$ to the working lines 1000$r$ and 1000$s$.

As best shown in FIG. 1A, the top panel 26 of the housing 20 supports the actual bag pressure gauge 1100$c$ such that the dial 1110$c$ of the actual bag pressure gauge 1100$c$ is viewable from the exterior of the housing 20.

It should be appreciated that, in this illustrated example embodiment, the pressure filter regulator 100 is: (i) directly fluidically connected to the incoming air pressure gauge 1100$a$, the normally open control valve 700, the pressure regulator 500, the normally closed control valve 800, and the control valve 200; and (ii) indirectly fluidically connected to the shuttle valve 900, the air pilot actuator of the control valve 200, the check valve 300, the inflation hose 60, the pressure repeater 600, the desired bag pressure gauge 1100$b$, and the air pilot actuator 702 of the normally open control valve 700.

It should also be appreciated that, in this illustrated example embodiment, the control valve 200 is: (i) directly fluidically connected to the check valve 300, and (ii) indirectly fluidically connected to the inflation hose 60.

It should also be appreciated that, in this illustrated example embodiment, the check valve 300 is directly fluidically connected to the inflation hose 60.

It should also be appreciated that, in this illustrated example embodiment, the pressure regulator 500 is: (i) directly fluidically connected to the pressure repeater 600 and the desired bag pressure gauge 1100$b$, and (ii) indirectly fluidically connected to the air pilot actuator 802 of the normally open control valve 700.

It should also be appreciated that, in this illustrated example embodiment, the pressure repeater 600 is directly fluidically connected to the air pilot actuator 702 of the normally open control valve 700.

It should also be appreciated that, in this illustrated example embodiment, the normally open control valve 700 is: (i) directly fluidically connected to the shuttle valve 900, and (ii) indirectly fluidically connected to the air pilot actuator of the control valve 200.

It should also be appreciated that, in this illustrated example embodiment, the normally closed control valve 800 is: (i) directly fluidically connected to the shuttle valve 900, and (ii) indirectly fluidically connected to the air pilot actuator of the control valve 200.

It should also be appreciated that, in this illustrated example embodiment, the shuttle valve 900 is directly fluidically connected to the air pilot actuator of the control valve 200.

It should also be appreciated that, in this illustrated example embodiment, the return air hose 80 is directly fluidically connected to the safety valve 400, the actual bag pressure gauge 1100$c$, and the pressure repeater 600.

In this example embodiment, the pressure filter regulator 100 is a Filter-Regulator available from Camozzi Pneumatics as Part No. MX-2-3/8-FR-1300, though it should be appreciated that the pressure filter regulator may be any suitable pressure filter regulator. In another embodiment, the pneumatic inflator employs one of the following instead of a pressure filter regulator with automatic water drain: (a) a pressure filter regulator with manual water drain, (b) a pressure filter regulator without a water drain, (c) a pressure regulator with automatic water drain and without air filtering capabilities, (d) a pressure regulator with manual water drain and without air filtering capabilities, (e) a pressure regulator without water drain and without air filtering capabilities, or (f) any other suitable pressure regulator.

In this example embodiment, the control valve 200 is a Foot Pedal Pneumatic Control Valve available from Parker Hannifin Corporation as Part No. PAR 524751000, though it should be appreciated that the control valve 200 may be any suitable control valve. It should also be appreciated that the control valve 200 may be actuated in any suitable manner other than by a foot pedal.

In this example embodiment, the check valve 300 is an In-Line Check Valve available from MSC Industrial Supply Co. as Part No. 04108486, though it should be appreciated that the check valve 300 may be any suitable check valve. In certain embodiments, the pneumatic inflator does not include the check valve.

In this example embodiment, the safety valve 400 is a Brass Pop-Safety Valve with Test Ring available from McMaster-Carr Supply Company as Part No. 9024K11, though it should be appreciated that the safety valve 400 may be any suitable safety valve, such as a safety valve having a variable $P_{Max}$ (described below).

In this example embodiment, the pressure regulator 500 is a Miniature Pressure Regulator available from Dwyer Instruments, Inc. as Part No. MPR2-1, though it should be appreciated that the pressure regulator 500 may be any suitable pressure regulator.

In this example embodiment, the pressure repeater 600 is a Normally-On Single Stage Pressure Repeater available from Clippard Instrument Laboratory, Inc. as Part No. 1043, though it should be appreciated that the pressure repeater 600 may be any suitable pressure repeater.

In this example embodiment, the normally open control valve 700 is a 3-Way Poppet Valve available from Clippard Instrument Laboratory, Inc. as Part No. MJVO-3, though it should be appreciated that the normally open control valve 700 may be any suitable normally open control valve. In this example embodiment, the air pilot actuator 702 of the normally open control valve 700 is a Single Acting Spring Return Pilot Actuator available from Clippard Instrument Laboratory, Inc. as Part No. MPA-10, though it should be appreciated that the air pilot actuator 702 may be any suitable air pilot actuator.

In this example embodiment, the normally closed control valve 800 is a 3-Way Poppet Valve available from Clippard Instrument Laboratory, Inc. as Part No. MJV-3, though it should be appreciated that the normally closed control valve 800 may be any suitable normally closed control valve. In this example embodiment, the push button actuator 802 of the normally closed control valve 800 is an Extended Push Button available from Clippard Instrument Laboratory, Inc. as Part No. P22-P2E-R, though it should be appreciated that the push button actuator 802 may be any suitable push button actuator.

In this example embodiment, the shuttle valve 900 is a Pneumatic Logic "OR" Valve available from Camozzi Pneumatics as Part No. 2LR-SB4-B, though it should be appreciated that the shuttle valve 900 may be any suitable shuttle valve.

In this example embodiment, the incoming air pressure gauge 1100a, the desired bag pressure gauge 1100b, and the actual bag pressure gauge 1100c are Dial Indicating Pressure Gauges available from NOSHOK, Inc. as Part No. 25-110-1/4-CFF-LL, though it should be appreciated that the incoming air pressure gauge 1100a, the desired bag pressure gauge 1100b, and the actual bag pressure gauge 1100c may be any suitable pressure gauges.

In this example embodiment, the coupling 120 is a Female Pipe Thread Nipple available from Parker Hannifin Corporation as Part No. H3C-E, though it should be appreciated that the coupling 120 may be any suitable coupling.

In this example embodiment, the couplings 50 and 70 are Female Bulkheads available from Camozzi Pneumatics as Part No. 6593, though it should be appreciated that the couplings 50 and 70 may be any suitable couplings.

Pneumatic Inflator Operation

The operation of the pneumatic inflator 10 of the present disclosure is (in part) described in association with FIGS. 4A to 4D, which illustrate the pneumatic circuit 2000 of the pneumatic inflator 10 while the pneumatic inflator 10 is operating.

To inflate an uninflated article, such as a dunnage bag 1200, using the pneumatic inflator 10, an operator positions the uninflated dunnage bag 1200 in a desired position, such as between two pieces of cargo in a cargo container. The operator connects: (a) the coupling of the inflation hose 60 to the corresponding coupling 50 of the pneumatic inflator 10, and (b) the coupling of the return air hose 80 to the corresponding coupling 70 of the pneumatic inflator 10. The operator operatively attaches an inflation head (not shown), which is operatively connected to ends of both the inflation hose 60 and the return air hose 80, to the dunnage bag 1200.

Once the operator operatively attaches the inflation head to the dunnage bag 1200, air at the air pressure inside the dunnage bag, which is referred to herein as $P_{Dunnage\ Bag}$, flows from the dunnage bag 1200 to the air inlet of the safety valve 400 via the return air hose 80 and the working lines 1000q and 1000t. Air at $P_{Dunnage\ Bag}$ also flows from the dunnage bag 1200 to the second air inlet of the pressure repeater 600 via the return air hose 80 and the working lines 1000q, 1000u, and 1000r. Air at $P_{Dunnage\ Bag}$ also flows from the dunnage bag 1200 to the air inlet of the actual bag pressure gauge 1100c via the return air hose 80 and the working lines 1000q, 1000u, and 1000s. The dial 1110c of the actual bag pressure gauge 1100c indicates $P_{Dunnage\ Bag}$.

The operator operatively connects the compressed air source to the coupling 120, which enables air to flow from the compressed air source to the air inlet of the pressure filter regulator 100 (as described above). If desired, the operator manipulates the pressure filter regulator 100 (by rotating the knob 102) to change the pressure of the air incoming from the compressed air source to a desired incoming air pressure. The operator manipulates the pressure regulator 500 (by rotating the knob 502) to indicate the desired dunnage bag pressure, which is referred to herein as $P_{Set}$.

Figure 4A:
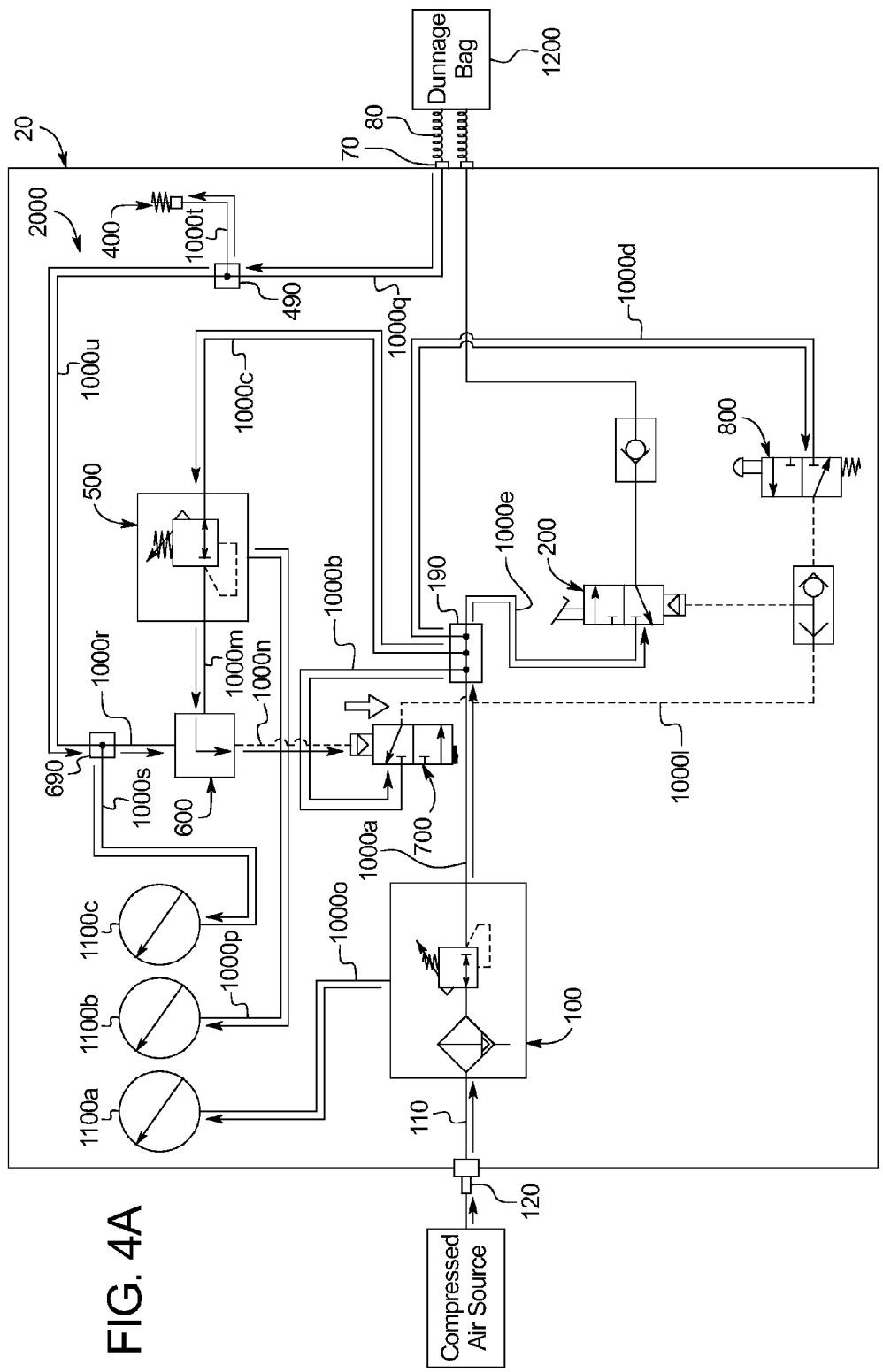
FIG. 4A is a pneumatic circuit diagram of the pneumatic inflator of FIG. 1A after a compressed air source is operatively coupled to the pneumatic inflator and the pneumatic inflator is operatively coupled to a dunnage bag at a point when the air pressure inside the dunnage bag is less than the desired dunnage bag air pressure.

FIG. 4A illustrates the pneumatic circuit 2000 after the operator has operatively connected the compressed air source to the coupling 120 of the pneumatic inflator 10 and the inflation head to the dunnage bag 1200. Since the dunnage bag 1200 is still uninflated at this point, $P_{Dunnage\ Bag} < P_{Set}$.

Once the compressed air source and the coupling 120 of the pneumatic inflator 10 are operatively connected, air flows from the compressed air source to the air inlet of the pressure filter regulator 100. The pressure filter regulator 100: (a) filters certain impurities out of the air; (b) automatically removes any water from the air and expels that water through the water drain 130; and (c) if the operator manipulated the pressure filter regulator 100 to change the pressure of the air incoming from the compressed air source to the desired incoming air pressure, reduces the pressure of the air to the desired incoming air pressure.

Air flows from pressure gauge air outlet of the pressure filter regulator 100 to the air inlet of the incoming air pressure gauge 1100a. The dial 1110a of the incoming air pressure gauge 1100a indicates the pressure of that air. The pressure of the air flowing from the pressure gauge air outlet and the air outlet of the pressure filter regulator 100 is referred to herein as $P_{Incoming}$. More specifically, if the operator manipulated the pressure filter regulator 100 to reduce the pressure of the air incoming from the compressed air source to a desired incoming air pressure, $P_{Incoming}$ refers to the desired incoming air pressure.

If the operator did not manipulate the pressure filter regulator 100 to reduce the pressure of the air incoming from the compressed air source to a desired incoming air pressure, $P_{Incoming}$ refers to the air pressure of the compressed air source.

Air at $P_{Incoming}$ flows from the air outlet of the pressure filter regulator 100 to the air inlet of the control valve 200 via the working lines 1000a and 1000e. At this point, the control valve 200 is in its normally closed position and, therefore, prevents air from flowing through the control valve 200.

Air at $P_{Incoming}$ also flows from the air outlet of the pressure filter regulator 100 to the air inlet of the normally closed control valve 800 via working lines 1000a and 1000d. At this point, the control valve 800 is in its normally closed position and, therefore, prevents air from flowing through the normally closed control valve 800.

Air at $P_{Incoming}$ also flows from the air outlet of the pressure filter regulator 100 to the air inlet of the pressure regulator 500 via working lines 1000a and 1000c. The pressure regulator 500 reduces the pressure of the air to $P_{Set}$. Air at $P_{Set}$ flows from the pressure gauge air outlet of the pressure regulator 500 to the air inlet of the desired bag pressure gauge 1100b. The dial 1110b of the desired bag pressure gauge 1100b indicates $P_{Set}$. Air at $P_{Set}$ also flows from the air outlet of the pressure regulator 500 to the first air inlet of the pressure repeater 600.

As noted above, air at $P_{Dunnage\ Bag}$ also flows from the dunnage bag into the second air inlet of the pressure repeater 600. When $P_{Dunnage\ Bag} < P_{Set}$, air at $P_{Set}$ flows from the air outlet of the pressure repeater 600 to the air pilot actuator 702 of the normally open control valve 700. On the other hand, when $P_{Dunnage\ Bag} > P_{Set}$, no air flows from the air outlet of the pressure repeater 600 to the air pilot actuator 702 of the normally open control valve 700. The pressure repeater 600 thus controls whether air at $P_{Set}$ flows from the air outlet of the pressure regulator 500 to the air pilot actuator 702 of the normally open control valve 700 based on $P_{Dunnage\ Bag}$ and $P_{Set}$.

At this point, since $P_{Dunnage\ Bag} < P_{Set}$, air at $P_{Set}$ flows from the air outlet of the pressure repeater 600 to the air pilot actuator 702 of the normally open control valve 700 via the pilot line 1000n. The flow of air from the air outlet of the pressure repeater 600 to the air pilot actuator 702 of the normally open control valve 700 actuates the normally open control valve 700 and causes the normally open control valve 700 to shift from its normally open position to its closed position and remain in its closed position as long as the flow of air through the pilot line 1000n is not interrupted.

Air at $P_{Incoming}$ also flows from the air outlet of the pressure filter regulator 100 to the air inlet of the normally open control valve 700 via the working lines 1000a and 1000b. Since, as described above, the normally open control valve 700 is in its closed position at this point (due to the air flowing from the air outlet of the pressure repeater 600 to the air pilot actuator 702 of the normally open control valve 700), the normally open control valve 700 prevents air from flowing through the normally open control valve 700.

To begin inflation of the dunnage bag 1200, the operator actuates the control valve 200 by stepping on (i.e., actuating) the foot pedal actuator 202. FIG. 4B illustrates the pneumatic circuit 2000 after the operator has stepped on the foot pedal actuator 202 to actuate the control valve 200. Since the dunnage bag 1200 is still substantially uninflated at this point, $P_{Dunnage\ Bag} < P_{Set}$.

Actuation of the foot pedal actuator 202 of the control valve 200 causes the control valve 200 to shift from its closed position to its open position, which enables air at $P_{Incoming}$ to flow through the control valve 200 and from the air outlet of the control valve 200 to the air inlet of the check valve 300 via the working line 1000f. Air at $P_{Incoming}$ flows through the check valve 300, from the air outlet of the check valve 300 into the inflation hose 60 via the working line 1000g, and from the inflation hose 60 into the dunnage bag 1200, which begins inflation of the dunnage bag 1200.

Once the operator actuates the foot pedal actuator 202 of the control valve 200 to shift the control valve 200 to its open position, the control valve 200 remains in its open position until the air pilot actuator of the control valve 200 is actuated, which causes the control valve 200 to shift back into its closed position (as described below).

Once the operator has actuated the control valve 200 to begin inflation of the dunnage bag 1200, there are a variety of ways in which the flow of air into the dunnage bag 1200 may be stopped.

Figure 4C:
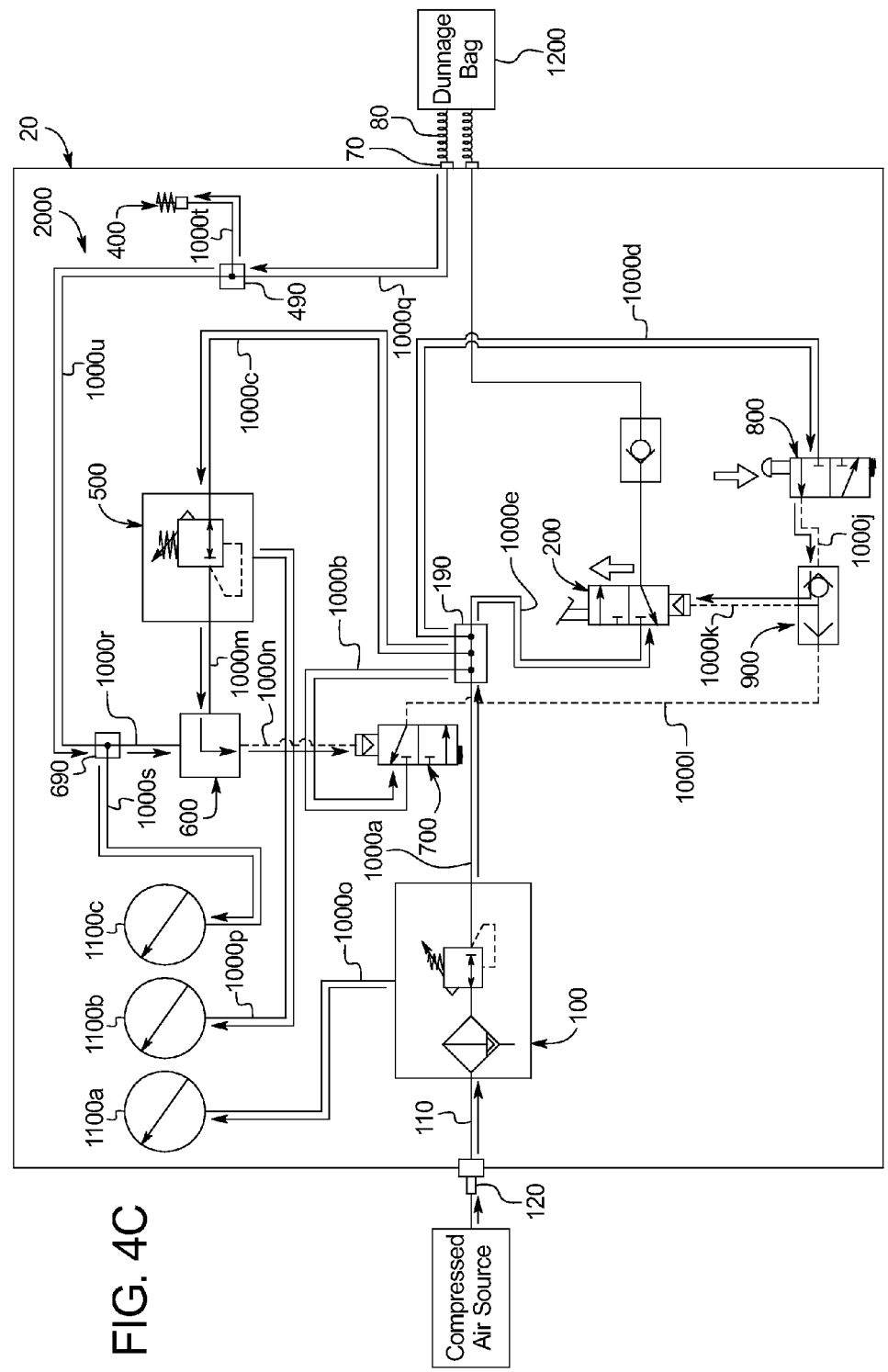
FIG. 4C is a pneumatic circuit diagram of the pneumatic inflator of FIG. 1A after the push button actuator of the normally closed control valve has been actuated at a point when the air pressure inside the dunnage bag is less than the desired dunnage bag air pressure.

FIG. 4C illustrates one manner in which an operator of the pneumatic inflator 10 can manually stop inflation of the dunnage bag before $P_{Dunnage\ Bag}$ reaches $P_{Set}$ by actuating the push button actuator 802 of the normally closed control valve 800.

When the operator actuates the push button actuator 802 of the normally closed control valve 800, the normally closed control valve 800 shifts from its normally closed position to its open position. This enables air at $P_{Incoming}$ to flow through the normally closed control valve 800 and from the air outlet of the normally closed control valve 800 to the second air inlet of the shuttle valve 900 via the pilot line 1000j. Air at $P_{Incoming}$ flows through the shuttle valve 900 and from the air outlet of the shuttle valve 900 to the air pilot actuator of the control valve 200 via the pilot line 1000k.

The flow of air from the air outlet of the shuttle valve 900 to the air pilot actuator of the control valve 200 actuates the control valve 200 and causes the control valve 200 to shift from its open position to its closed position, which prevents air from flowing through the control valve 200. This cuts off the flow of air from the air outlet of the control valve 200, through the working line 1000f, through the check valve 300, through the working line 1000g, and through the inflation hose 60 to the dunnage bag 1200, which stops inflation of the dunnage bag 1200.

Once the air pilot actuator of the control valve 200 is actuated to shift the control valve 200 into its closed position, the control valve 200 remains in its closed position until the operator actuates the foot pedal actuator 202 of the control valve 200, which causes the control valve 200 to shift back into its open position (as described above).

Figure 4D:
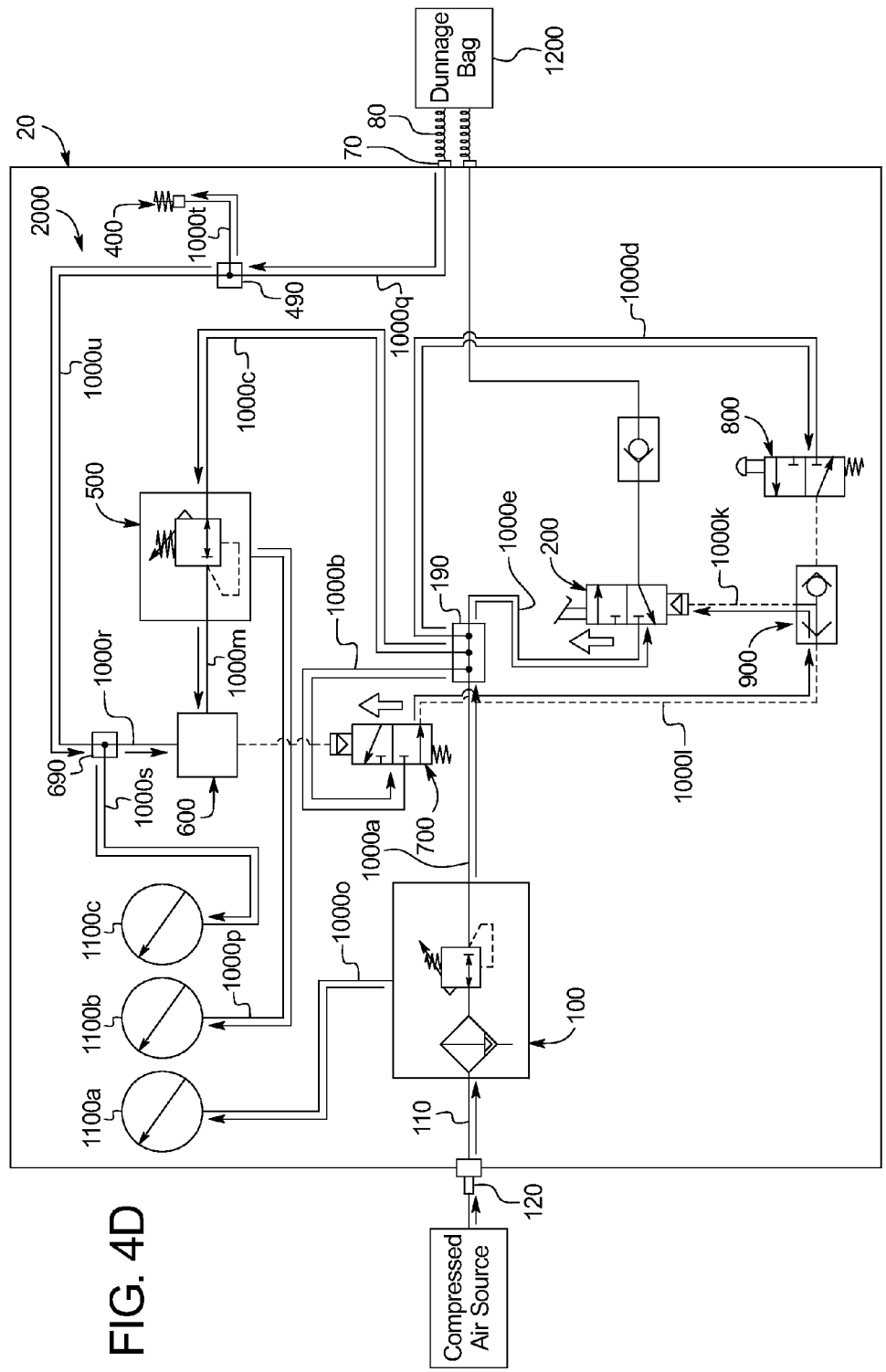
FIG. 4D is a pneumatic circuit diagram of the pneumatic inflator of FIG. 1A after the air pressure inside the dunnage bag reaches the desired dunnage bag air pressure and the pneumatic inflator automatically stops inflating the dunnage bag.

FIG. 4D illustrates one manner in which the pneumatic inflator 10 automatically stops inflation of the dunnage bag when $P_{Dunnage\ Bag}$ reaches or exceeds $P_{Set}$.

As noted above, the pressure repeater 600 enables air at $P_{Set}$ to flow from the air outlet of the pressure regulator 500 through the pressure repeater 600 and to the air pilot actuator 702 of the normally open control valve 700 when $P_{Dunnage\ Bag} < P_{Set}$. On the other hand, the pressure repeater 600 does not enable air to flow from the air outlet of the pressure regulator 500 through the pressure repeater 600 and to the air pilot actuator 702 of the normally open control valve 700 when $P_{Dunnage\ Bag} > P_{Set}$.

Thus, when the $P_{Dunnage\ Bag}$ reaches $P_{Set}$, the pressure repeater 600 cuts off the flow of air at $P_{Set}$ from the air outlet of the pressure repeater 600 to the air pilot actuator 702 of the normally open control valve 700. This causes the normally open control valve 700 to shift from its closed position to its normally open position. This enables air at $P_{Incoming}$ to flow through the control valve 700 and from the air outlet of the control valve 700 to the first air inlet of the shuttle valve 900 via the pilot line 1000l. Air at $P_{Incoming}$ flows through the shuttle valve 900 and from the air outlet of the shuttle valve 900 to the air pilot actuator of the control valve 200 via the pilot line 1000k.

The flow of air from the shuttle valve 900 to the air pilot actuator of the control valve 200 actuates the control valve 200 and causes the control valve 200 to shift from its open position to its closed position, which prevents air from flowing through the control valve 200. This cuts off the flow of air from the air outlet of the control valve 200, through the working line 1000f, through the check valve 300, through the working line 1000g, and through the inflation hose 60 to the dunnage bag 1200, which stops inflation of the dunnage bag 1200.

Once the air pilot actuator of the control valve 200 is actuated to shift the control valve 200 into its closed position, the control valve 200 remains in its closed position until the operator actuates the foot pedal actuator 202 of the control valve 200, which causes the control valve 200 to shift back into its open position (as described above).

In this example embodiment, the safety valve 400 is configured to prevent $P_{Dunnage\ Bag}$ from reaching a designated maximum pressure, which is referred to herein as $P_{Max}$. It should be appreciated that $P_{Max}$ may be any suitable pressure, such as (but not limited to) a designated maximum safe operating pressure of the dunnage bag.

More specifically, in this example embodiment, once the operator operatively attaches the inflation head to the dunnage bag 1200, air at $P_{Dunnage\ Bag}$ flows from the dunnage bag 1200 to the air inlet of the safety valve 400 via the return air hose 80 and the working lines 1000$q$ and 1000$t$. If $P_{Dunnage\ Bag} > P_{Max}$, the safety valve 400 opens the one or more relief ports (such as through automatic actuation of a spring-biased plunger from a normally closed position to a normally open position) such that air can flow from the dunnage bag 1200 to the working line 1000$q$, through the working line 1000$q$ to the working line 1000$t$, through the working line 1000$t$ to the air inlet of the safety valve 400, through the safety valve 400 to the one or more relief ports of the safety valve 400, and from the relief ports to the atmosphere. Once $P_{Dunnage\ Bag}$ reaches or falls below $P_{Max}$, the safety valve automatically closes the one or more relief ports.

Thus, in this example embodiment, when $P_{Dunnage\ Bag} > P_{Max}$, the safety valve 400 automatically opens the one or more relief ports and enables air to escape from the dunnage bag into the atmosphere, and when $P_{Dunnage\ Bag}$ subsequently reaches $P_{Max}$, the safety valve 400 automatically closes the one or more relief ports to prevent air from escaping from the dunnage bag into the atmosphere. The operator may also manually open the one or more relief ports of the safety valve 400 by actuating the manual relief ring. Accordingly, in this example embodiment, the safety valve 400 prevents over-inflation of the dunnage bag should certain components of the pneumatic inflator 10, such as the pressure repeater 600, the normally open control valve 700, control valve 200, the shuttle valve 900, and/or the normally closed control valve 800, fail such that the pneumatic inflator continues to inflate the dunnage bag once $P_{Dunnage\ Bag}$ reaches $P_{Set}$ or once the push button actuator 802 of the normally closed control valve 800 is actuated.

Variations

Figure 5:
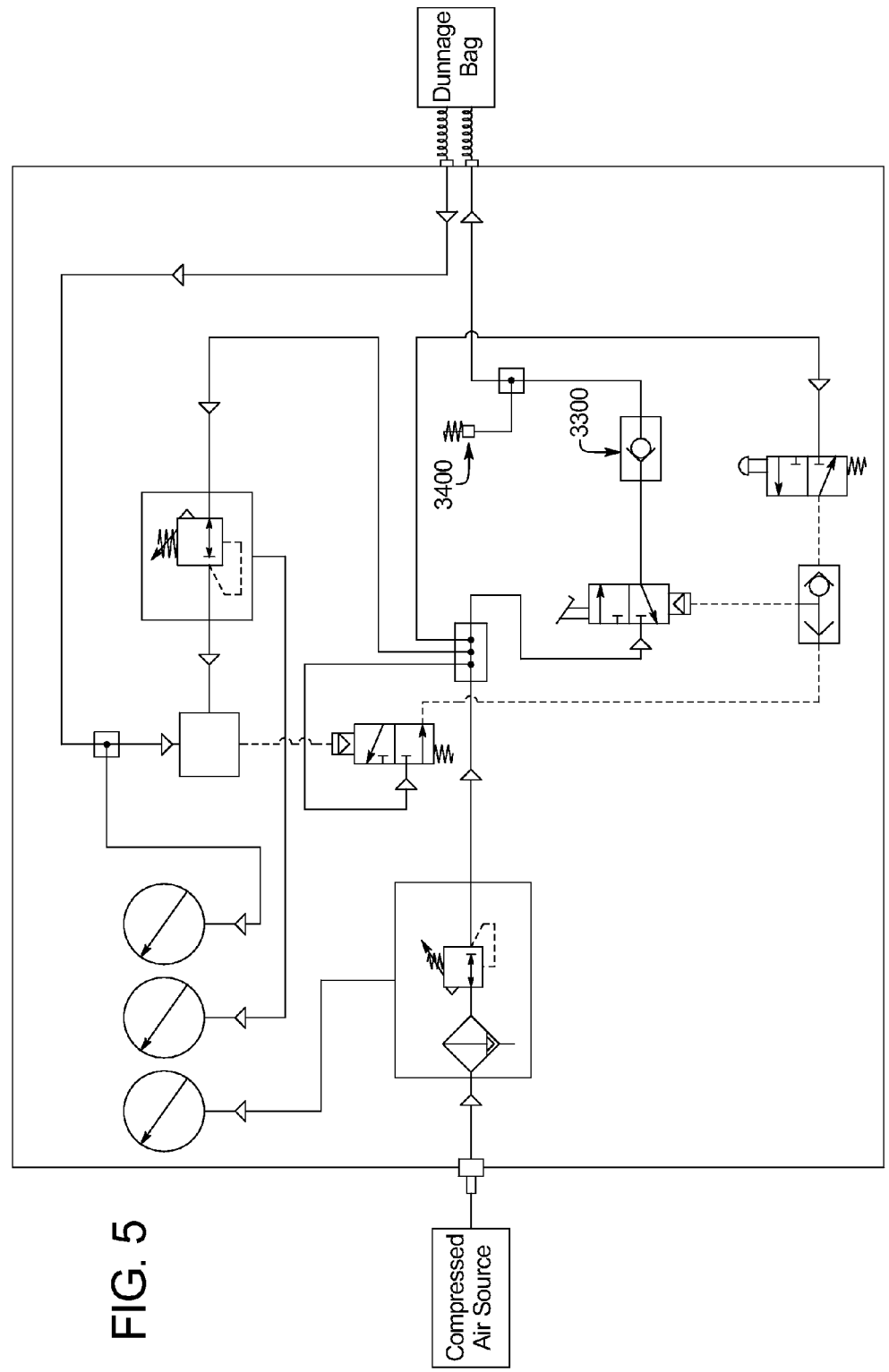
FIG. 5 is a pneumatic circuit diagram of the pneumatic circuit of another embodiment of the pneumatic inflator of the present disclosure including a differently-located safety valve.

FIG. 5 illustrates a pneumatic circuit diagram of another embodiment of the pneumatic inflator including a differently-positioned safety valve 3400. In this embodiment, the check valve 3300 is fluidically connected to the safety valve 3400 such that air may flow from the air outlet of the check valve 3300 to the air inlet of the safety valve 3400. In this example embodiment, the safety valve 3400 is configured to prevent $P_{Incoming}$ from reaching a designated maximum pressure, which is referred to herein as $P_{Max}$. It should be appreciated that $P_{Max}$ may be any suitable pressure, such as (but not limited to) a designated maximum safe dunnage bag inflation pressure.

More specifically, in this example embodiment, after the operator has operatively connected the compressed air source to the coupling of the pneumatic inflator and the inflation head to the dunnage bag and after the operator has stepped on the foot pedal actuator to actuate the control valve, air at $P_{Incoming}$ flows through the control valve and from the air outlet of the control valve to the air inlet of the check valve 3300. Air at $P_{Incoming}$ flows through the check valve 3300, from the air outlet of the check valve 3300 into the air inlet of the safety valve 3400. If $P_{Incoming} > P_{Max}$, the safety valve 3400 opens the one or more relief ports such that air can flow from the air outlet of the check valve 3300 to the air inlet of the safety valve 400, through the safety valve 400 to the one or more relief ports of the safety valve 400, and from the relief ports to the atmosphere. Once $P_{Incoming}$ reaches or falls below $P_{Max}$, the safety valve automatically closes the one or more relief ports.

Thus, in this example embodiment, when $P_{Incoming} > P_{Max}$, the safety valve 3400 automatically opens the one or more relief ports and enables air to escape into the atmosphere before flowing into the dunnage bag, and when $P_{Incoming}$ subsequently reaches $P_{Max}$, the safety valve 3400 automatically closes the one or more relief ports to enable air to flow into the dunnage bag. The operator may also manually open the one or more relief ports of the safety valve 3400 by actuating the manual relief ring. Accordingly, in this example embodiment, the safety valve 3400 prevents inflation of the dunnage bag at dangerous dunnage bag inflation pressures.

In another embodiment, the pneumatic inflator includes a normally open pressure valve instead of a pressure repeater. As described below, the normally open pressure valve is configured to detect when $P_{Dunnage\ Bag} > P_{Set}$ and, at that point, automatically shift the normally open pressure valve from its open position to its closed position.

In one example embodiment, the normally open pressure valve includes a first air inlet, a second air inlet, an air outlet, and a pressure sensor. In this embodiment, the pressure valve is fluidically connected to the normally open control valve such that air may flow from the air outlet of the normally open pressure valve to the air pilot actuator of the normally open control valve (to cause the air pilot actuator of the normally open control valve to actuate the normally open control valve (as described above)). In this example embodiment, the working line that terminates in the coupling that is configured to connect to the corresponding coupling of the return air hose (described above) is fluidically connected to the pressure repeater such that air may flow from the working line to the second air inlet of the normally open pressure valve. In this example embodiment, the pressure regulator is fluidically connected to the normally open pressure valve such that air may flow from the air outlet of the pressure regulator to the first air inlet of the normally open pressure valve.

In this example embodiment, air at $P_{Incoming}$ also flows from the air outlet of the pressure filter regulator to the air inlet of the pressure regulator. The pressure regulator reduces the pressure of the air to $P_{Set}$. Air at $P_{Set}$ also flows from the air outlet of the pressure regulator to the first air inlet of the normally open pressure valve. As noted above, air at $P_{Dunnage\ Bag}$ also flows from the dunnage bag into the second air inlet of the normally open pressure valve. When $P_{Dunnage\ Bag} < P_{Set}$, air at $P_{Set}$ flows from the air outlet of the normally open pressure valve to the air pilot actuator of the normally open control valve. On the other hand, when $P_{Dunnage\ Bag} > P_{Set}$, the normally open pressure valve shifts to its closed position and, therefore, no air flows from the air outlet of the normally open pressure valve to the air pilot actuator of the normally open control valve. In this example embodiment, the normally open pressure valve thus controls whether air at $P_{Set}$ flows from the air outlet of the pressure regulator to the air pilot actuator of the normally open control valve based on $P_{Dunnage\ Bag}$ and $P_{Set}$.

In certain embodiments, the pneumatic inflator does not employ the pressure regulator 500. In these embodiments, an operator uses the pressure filter regulator 100 to set $P_{Set}$. It should thus be appreciated that, in these embodiments, $P_{Incoming} = P_{Set}$.

It should be understood that modifications and variations may be effected without departing from the scope of the novel concepts of the present disclosure, and it should be understood that this application is to be limited only by the scope of the appended claims.

The invention is claimed as follows:

1. A pneumatic inflator comprising:
   a housing;
   a first pressure regulator supported by the housing, a compressed air source being fluidically connectable to the first pressure regulator such that air may flow from the compressed air source to the first pressure regulator;
   a control valve supported by the housing, the control valve being fluidically connectable to an inflation hose such that air may flow from the control valve to the inflation hose;
   a normally open actuatable control valve supported by the housing;
   a second pressure regulator supported by the housing; and
   a pressure repeater supported by the housing, a return air hose being fluidically connectable to the pressure repeater such that air may flow from the return air hose to the pressure repeater;
   wherein the first pressure regulator, the control valve, the normally open control valve, the second pressure regulator, and the pressure repeater are arranged such that, when the compressed air source is fluidically connected to the first pressure regulator, the control valve is fluidically connected to the inflation hose, and the return air hose is fluidically connected to the pressure repeater:
   (a) when: (i) air pressure inside the return air hose is less than a desired air pressure set by the second pressure regulator, and (ii) the control valve is actuated from a closed position to an open position, air flows from the compressed air source into the inflation hose; and
   (b) thereafter, when the air pressure inside the return air hose exceeds the desired air pressure, the control valve is automatically actuated into the closed position, which stops the air flow from the compressed air source into the inflation hose.

2. The pneumatic inflator of claim 1, wherein the control valve includes a manual actuator that, when actuated when the control valve is in the closed position, shifts the control valve from the closed position to the open position.

3. The pneumatic inflator of claim 2, wherein the manual actuator includes a foot pedal.

4. The pneumatic inflator of claim 1, which includes a normally closed actuatable control valve supported by the housing, and wherein the first pressure regulator, the control valve, the normally open control valve, the second pressure regulator, the pressure repeater, and the normally closed control valve are arranged such that, when the compressed air source is fluidically connected to the first pressure regulator, the control valve is fluidically connected to the inflation hose, and the pressure repeater is fluidically connected to the return air hose:
   (a) when: (i) the air pressure inside the return air hose is less than the desired air pressure, and (ii) the control valve is actuated into the open position, air flows from the compressed air source into the inflation hose; and
   (b) thereafter, when the normally closed control valve is actuated from a closed position to an open position, the control valve is automatically actuated into the closed position, which stops the air flow from the compressed air source into the inflation hose.

5. The pneumatic inflator of claim 4, wherein the normally closed control valve includes a manual actuator that, when actuated when the normally closed control valve is in the closed position, shifts the normally closed control valve from the closed position to the open position.

6. The pneumatic inflator of claim 5, wherein the manual actuator includes a push button.

7. The pneumatic inflator of claim 1, wherein the pressure repeater is configured to: (a) when air of a first pressure flows from the return air hose into a first air inlet of the pressure repeater and air of a second pressure flows from the second pressure regulator into a second air inlet of the pressure repeater, the second pressure being greater than the first pressure, enable air to flow from the second air inlet of the pressure repeater through the pressure repeater; and (b) when air of a third pressure flows from the return air hose into the first air inlet of the pressure repeater and air of a fourth pressure flows from the second pressure regulator into the second air inlet of the pressure repeater, the third pressure being greater than the fourth pressure, prevent air from flowing from the second air inlet of the pressure repeater through the pressure repeater.

8. The pneumatic inflator of claim 1, wherein:
   (1) the control valve includes an air inlet, an air outlet, and an air pilot actuator, the control valve being fluidically connectable to the inflation hose such that air may flow from the air outlet of the control valve to the inflation hose;
   (2) the normally open control valve includes an air inlet, an air outlet, and an air pilot actuator, the normally open control valve being fluidically connected to the control valve such that air may flow from the air outlet of the normally open control valve to the air pilot actuator of the control valve;
   (3) the pressure repeater includes a first air inlet, a second air inlet, and an air outlet, the pressure repeater being fluidically connected to the normally open control valve such that air may flow from the air outlet of the pressure repeater to the air pilot actuator of the normally open control valve, the return air hose being fluidically connectable to the pressure repeater such that air may flow from the return air hose to the first air inlet of the pressure repeater;
   (4) the second pressure regulator includes an air inlet and an air outlet, the second pressure regulator being fluidically connected to the pressure repeater such that air may flow from the air outlet of the second pressure regulator to the second air inlet of the pressure repeater; and
   (5) the first pressure regulator includes an air inlet and an air outlet, the first pressure regulator being fluidically connected to: (a) the control valve such that air may flow from the air outlet of the first pressure regulator to the air inlet of the control valve, (b) the normally open control valve such that air may flow from the air outlet of the first pressure regulator to the air inlet of the normally open control valve, and (c) the second pressure regulator such that air may flow from the air outlet of the first pressure regulator to the air inlet of the second pressure regulator.

9. A pneumatic circuit comprising:
   a control valve including an air inlet, an air outlet, and an air pilot actuator, the control valve being fluidically connectable to an inflation hose such that air may flow from the air outlet of the control valve to the inflation hose;

a normally open control valve including an air inlet, an air outlet, and an air pilot actuator, the normally open control valve being fluidically connected to the control valve such that air may flow from the air outlet of the normally open control valve to the air pilot actuator of the control valve;

a pressure repeater including a first air inlet, a second air inlet, and an air outlet, the pressure repeater being fluidically connected to the normally open control valve such that air may flow from the air outlet of the pressure repeater to the air pilot actuator of the normally open control valve, a return air hose being fluidically connectable to the pressure repeater such that air may flow from the return air hose to the first air inlet of the pressure repeater;

a first pressure regulator including an air inlet and an air outlet, the first pressure regulator being fluidically connected to the pressure repeater such that air may flow from the air outlet of the first pressure regulator to the second air inlet of the pressure repeater; and a second pressure regulator including an air inlet and an air outlet, the second pressure regulator being fluidically connected to: (a) the control valve such that air may flow from the air outlet of the second pressure regulator to the air inlet of the control valve, (b) the normally open control valve such that air may flow from the air outlet of the second pressure regulator to the air inlet of the normally open control valve, and (c) the first pressure regulator such that air may flow from the air outlet of the second pressure regulator to the air inlet of the first pressure regulator.

10. The pneumatic circuit of claim 9, wherein the pressure repeater is configured to: (a) when air of a first pressure flows into the first air inlet of the pressure repeater and air of a second pressure flows into the second air inlet of the pressure repeater, the second pressure being greater than the first pressure, enable air to flow from the second air inlet of the pressure repeater through the pressure repeater and to the air pilot actuator of the normally open control valve; and (b) when air of a third pressure flows into the first air inlet of the pressure repeater and air of a fourth pressure flows into the second air inlet of the pressure repeater, the third pressure being greater than the fourth pressure prevent air from flowing from the second air inlet of the pressure repeater through the pressure repeater and to the air pilot actuator of the normally open control valve.

11. The pneumatic circuit of claim 9, which includes a check valve including an air inlet and an air outlet, the control valve being fluidically connected to the check valve such that air may flow from the air outlet of the control valve to the air inlet of the check valve, the check valve being fluidically connectable to an inflation hose such that air may flow from the air outlet of the check valve to the inflation hose.

12. The pneumatic circuit of claim 11, wherein the control valve is fluidically connectable to the inflation hose such that air may flow from the air outlet of the control valve to and through the check valve and to the inflation hose.

13. The pneumatic circuit of claim 9, which includes a normally closed control valve including an air inlet and an air outlet, the second pressure regulator being fluidically connected to the normally closed control valve such that air may flow from the air outlet of the second pressure regulator to the air inlet of the normally closed control valve, the normally closed control valve being fluidically connected to the control valve such that air may flow from the air outlet of the normally closed control valve to the air pilot actuator of the control valve.

14. The pneumatic circuit of claim 13, wherein the normally closed control valve includes a manual actuator that, when actuated when the normally closed control valve is in a closed position, shifts the normally closed control valve from the closed position to an open position.

15. The pneumatic circuit of claim 13, which includes a shuttle valve including a first air inlet, a second air inlet, and an air outlet, the normally open control valve being fluidically connected to the shuttle valve such that air may flow from the air outlet of the normally open control valve to the first air inlet of the shuttle valve, the normally closed control valve being fluidically connected to the shuttle valve such that air may flow from the air outlet of the normally closed control valve to the second air inlet of the shuttle valve, the shuttle valve being fluidically connected to the control valve such that air may flow from the air outlet of the shuttle valve to the air pilot actuator of the control valve.

16. The pneumatic circuit of claim 15, wherein the normally open control valve is indirectly fluidically connected to the control valve such that air may flow from the air outlet of the normally open control valve to and through the shuttle valve and to the air pilot actuator of the control valve.

17. The pneumatic circuit of claim 15, wherein the normally closed control valve is indirectly fluidically connected to the control valve such that air may flow from the air outlet of the normally closed control valve to and through the shuttle valve and to the air pilot actuator of the control valve.

18. The pneumatic circuit of claim 9, which includes a safety valve including an air inlet, the return air hose being fluidically connectable to the safety valve such that air may flow from the return air hose to the air inlet of the safety valve.

19. The pneumatic circuit of claim 9, wherein the control valve includes a manual actuator that, when actuated when the control valve is in a closed position, shifts the control valve from the closed position to an open position.

20. A pneumatic circuit comprising:
a control valve including an air inlet, an air outlet, and an air pilot actuator, the control valve being fluidically connectable to an inflation hose such that air may flow from the air outlet of the control valve to the inflation hose;

a shuttle valve including a first air inlet, a second air inlet, and an air outlet, the shuttle valve being fluidically connected to the control valve such that air may flow from the air outlet of the shuttle valve to the air pilot actuator of the control valve;

a normally open control valve including an air inlet, an air outlet, and an air pilot actuator, the normally open control valve being fluidically connected to the shuttle valve such that air may flow from the air outlet of the normally open control valve to the first air inlet of the shuttle valve;

a normally closed control valve including an air inlet and an air outlet, the normally closed control valve being fluidically connected to the shuttle valve such that air may flow from the air outlet of the normally closed control valve to the second air inlet of the shuttle valve;

a pressure repeater including a first air inlet, a second air inlet, and an air outlet, the pressure repeater being fluidically connected to the normally open control valve such that air may flow from the air outlet of the pressure repeater to the air pilot actuator of the normally open control valve, a return air hose being fluidically connectable to the pressure repeater such that air may flow from the return air hose to the first air inlet of the pressure repeater;

a first pressure regulator including an air inlet and an air outlet, the first pressure regulator being fluidically connected to the pressure repeater such that air may flow from the air outlet of the first pressure regulator to the second air inlet of the pressure repeater; and a second pressure regulator including an air inlet and an air outlet, the second pressure regulator being fluidically connected to: (a) the control valve such that air may flow from the air outlet of the second pressure regulator to the air inlet of the control valve, (b) the normally open control valve such that air may flow from the air outlet of the second pressure regulator to the air inlet of the normally open control valve, (c) the first pressure regulator such that air may flow from the air outlet of the second pressure regulator to the air inlet of the first pressure regulator, and (d) the normally closed control valve such that air may flow from the air outlet of the second pressure regulator to the air inlet of the normally closed control valve.

* * * * *